United States Patent
Takizawa et al.

(10) Patent No.: US 10,291,325 B2
(45) Date of Patent: May 14, 2019

(54) OPTICAL NETWORK UNIT, PON SYSTEM, AND METHOD OF CONTROLLING OPTICAL NETWORK UNIT

(71) Applicant: SUMITOMO ELECTRIC INDUSTRIES, LTD., Osaka-shi, Osaka (JP)

(72) Inventors: Yasuhiro Takizawa, Osaka (JP); Shuitsu Yuda, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/542,984

(22) PCT Filed: Jul. 28, 2016

(86) PCT No.: PCT/JP2016/072152
§ 371 (c)(1),
(2) Date: Jul. 12, 2017

(87) PCT Pub. No.: WO2017/098747
PCT Pub. Date: Jun. 15, 2017

(65) Prior Publication Data
US 2018/0005518 A1    Jan. 4, 2018

(30) Foreign Application Priority Data

Dec. 9, 2015   (WO) .................. PCT/JP2015/084565

(51) Int. Cl.
*G08C 23/04*    (2006.01)
*H04B 10/40*    (2013.01)
(Continued)

(52) U.S. Cl.
CPC ............ *H04B 10/40* (2013.01); *G08C 23/04* (2013.01); *H04L 12/2885* (2013.01); *H04L 12/44* (2013.01); *H04Q 11/0001* (2013.01)

(58) Field of Classification Search
CPC  H04B 10/40; H04Q 11/0001; H04L 12/2885; H04L 12/44; G08C 23/04
See application file for complete search history.

(56) References Cited

U.S. PATENT DOCUMENTS

2009/0232516 A1*  9/2009  Hirano .................. H04J 3/1694
                                              398/182
2010/0061729 A1*  3/2010  Weeber ................. H04J 3/1694
                                              398/71
(Continued)

FOREIGN PATENT DOCUMENTS

JP    2007-243861 A   9/2007
JP    2012-049711 A   3/2012
(Continued)

*Primary Examiner* — Casey L Kretzer
(74) *Attorney, Agent, or Firm* — Drinker Biddle & Reath LLP

(57) ABSTRACT

An optical network unit according to one manner of the present invention includes an optical transceiver configured to be connected to an optical communication line, a plurality of media access control (MAC) processing units, a plurality of user network interface (UNI) ports each connected to one MAC processing unit of the plurality of MAC processing units, and an integration unit integrating a plurality of communication paths connected to the plurality of MAC processing units, respectively, and connected to the optical transceiver.

18 Claims, 21 Drawing Sheets

(51) Int. Cl.
      *H04L 12/28*      (2006.01)
      *H04L 12/44*      (2006.01)
      *H04Q 11/00*      (2006.01)

(56) References Cited

U.S. PATENT DOCUMENTS

| | | | |
|---|---|---|---|
| 2011/0085197 A1* | 4/2011 | Kim | H04L 12/6418 |
| | | | 358/1.15 |
| 2012/0236869 A1* | 9/2012 | Julien | H04L 49/351 |
| | | | 370/400 |
| 2012/0288279 A1* | 11/2012 | Zhang | H04B 10/272 |
| | | | 398/66 |
| 2017/0171647 A1* | 6/2017 | Gao | H04Q 11/0005 |

FOREIGN PATENT DOCUMENTS

| | | |
|---|---|---|
| JP | 2012-213121 A | 11/2012 |
| JP | 2013-247581 A | 12/2013 |
| JP | 2014-155177 A | 8/2014 |
| JP | 2015-033003 A | 2/2015 |

\* cited by examiner

OPTICAL NETWORK UNIT, PON SYSTEM, AND METHOD OF CONTROLLING OPTICAL NETWORK UNIT

TECHNCAL FELD

The present invention relates to an optical network unit, a passive optical network (PON) system, and a method of controlling an optical network unit.

The present application claims priority to nternational Application PCT/JP2015/84565 filed on Dec. 9, 2015, contents of which are incorporated by reference herein in their entirety.

BACKGROUND ART

Japanese Patent Laying-Open No. 2015-33003 (PTD 1) discloses one configuration example of an optical unit (ONU). This ONU includes a variable wavelength optical transceiver, a physical (PHY)/media access control (MAC) processing unit, and a user network interface (UNI) processing unit. One PHY/MAC processing unit is provided and one UNI processing unit is provided.

For example, Japanese Patent Laying-Open No. 2007-243861 (PTD 2) discloses an ONU including a plurality of UNI ports. Japanese Patent Laying-Open No. 2015-33003 and Japanese Patent Laying-Open No. 2014-155177 (PTD 3) disclose an OLT having a plurality of MAC processing units.

CTATON LST

Patent Document

PTD 1: Japanese Patent Laying-Open No. 2015-33003
PTD 2: Japanese Patent Laying-Open No. 2007-243861
PTD 3: Japanese Patent Laying-Open No. 2014-155177

SUMMARY OF NVENTON

An optical network unit according to the present disclosure includes an optical transceiver configured to be connected to an optical communication line, a plurality of media access control (MAC) processing units, a plurality of user network interface (UNI) ports each connected to one MAC processing unit of the plurality of MAC processing units, and an integration unit integrating a plurality of communication paths connected to the plurality of MAC processing units, respectively, and connected to the optical transceiver.

A passive optical network (PON) system according to the present disclosure includes an optical communication line, an optical line terminal connected to the optical communication line, and an optical network unit connected to the optical communication line. The optical network unit includes an optical transceiver configured to be connected to the optical communication line, a plurality of media access control (MAC) processing units, a plurality of user network interface (UNI) ports each connected to one MAC processing unit of the plurality of MAC processing units, and an integration unit integrating a plurality of communication paths connected to the plurality of MAC processing units, respectively, and connected to the optical transceiver.

A method according to the present disclosure is a method of controlling an optical network unit. The optical network unit includes an optical transceiver configured to be connected to an optical communication line, a plurality of media access control (MAC) processing units, a plurality of user network interface (UNI) ports each connected to one MAC processing unit of the plurality of MAC processing units, and an integration unit integrating a plurality of communication paths connected to the plurality of MAC processing units, respectively, and connected to the optical transceiver. The method includes generating a transmission permission instruction by one MAC processing unit of the plurality of MAC processing units and setting a communication path for transmitting an upstream signal from among the plurality of communication paths in response to the transmission permission instruction.

BREF DESCRPTON OF DRAWNGS

DESCRPTON OF EMBODMENTS

Figure 1:
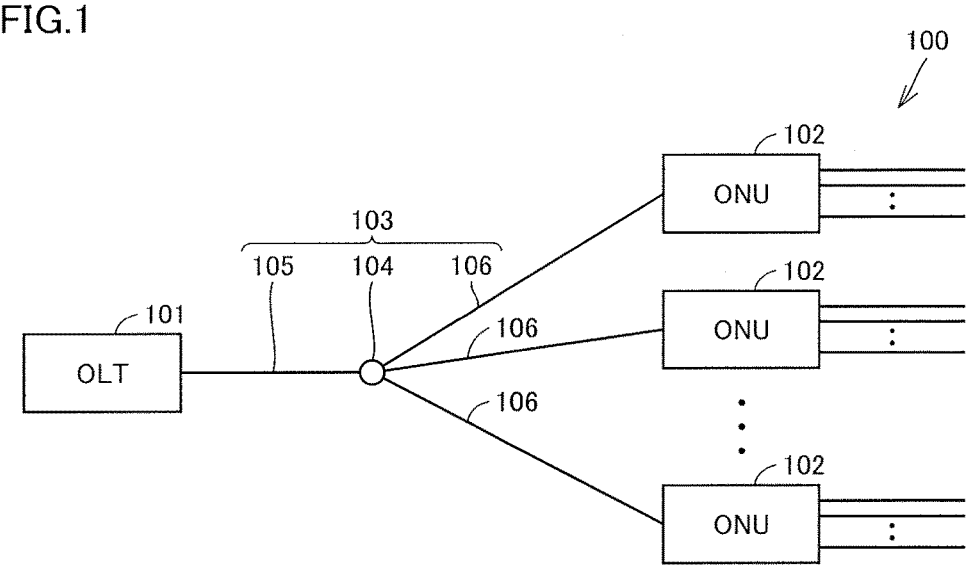
FIG. 1 is a block diagram showing a schematic configuration of a PON system according to one embodiment of the present invention.

[Problems to be Solved by the Present Disclosure]

Demands for communication services (for example, a communication speed) are different for each user. A UNI port is connected to a user terminal device or a user network. An OLT can desirably provide services different for each UNI port.

The number of logical links in one MAC processing unit is limited. One MAC processing unit cannot manage UNI ports in number exceeding the upper limit. According to Japanese Patent Laying-Open No. 2007-243861, an ONU can have a plurality of UNI ports. The number of UNI ports, however, is restricted to the upper limit or less.

According to Japanese Patent Laying-Open No. 2015-33003, each ONU has one MAC processing unit and one UNI port. When this configuration is adopted, however, the number of ONUs is equal to the number of UNI ports. When the number of ONUs is greater, optical fiber resources are insufficient. n order to connect more ONUs to an optical fiber line, an optical fiber may be branched by an optical branch. Loss budget (a difference between lowest transmission power of an OLT and a maximum value for lowest reception sensitivity of an ONU) in a downstream direction, however, cannot effectively be used. Therefore, quality of service may lower.

An object of the present disclosure is to provide an optical network unit which can realize management of a plurality of UNI ports and can efficiently make use of optical communication line resources, a PON system including the same, and a method of controlling an optical network unit.

[Effects of the Present Disclosure]

According to the present disclosure, an optical network unit which can efficiently make use of optical communication line resources while it realizes management of a plurality of UNI ports is realized.

[DESCRPTON OF EMBODMENTS OF THE PRESENT NVENTON]

Embodiments of the present invention will initially be listed and described.

(1) An optical network unit according to one manner of the present invention includes an optical transceiver configured to be connected to an optical communication line, a plurality of media access control (MAC) processing units, a plurality of user network interface (UNI) ports each connected to one MAC processing unit of the plurality of MAC processing units, and an integration unit integrating a plurality of communication paths connected to the plurality of MAC processing units, respectively, and connected to the optical transceiver.

According to the above, an optical network unit which can efficiently make use of optical communication line resources while it realizes management of a plurality of UNI ports is realized. Each MAC processing unit can manage a UNI port connected thereto. Since the optical network unit accommodates a plurality of MAC processing units, the number of optical network units connected to an optical communication line is smaller than the number of UNI ports. Therefore, optical communication line resources (optical fiber lines) can efficiently be made use of.

The number of MAC processing units may be the same as the number of UNI ports. Alternatively, the number of MAC processing units may be greater than the number of UNI ports.

(2) Preferably, the integration unit sets a communication path for transmitting an upstream signal from among the plurality of communication paths in response to a transmission permission instruction.

According to the above, collision (temporal overlap) of a plurality of upstream signals in the integration unit can be prevented.

(3) Preferably, the optical network unit further includes a distribution unit distributing, when the optical transceiver receives a downstream signal, the downstream signal to the plurality of MAC processing units.

According to the above, all MAC processing units in the optical network unit can receive a downstream signal.

(4) Preferably, the optical transceiver is activated after the integration unit is activated, and the integration unit is deactivated when the optical transceiver is deactivated.

According to the above, the optical transceiver can be prevented from issuing an unstable optical signal (upstream signal).

(5) Preferably, the plurality of MAC processing units include a spare MAC processing unit. The optical network unit further includes a path switching unit for switching a path for communication between the plurality of UNI ports and the plurality of MAC processing units. When a MAC processing unit connected to any of the plurality of UNI ports fails, the path switching unit makes switching from the failed MAC processing unit to the spare MAC processing unit.

According to the above, redundancy switch among the plurality of MAC processing units can be realized. Therefore, the optical network unit can continuously operate.

(6) Preferably, the optical network unit further includes a spare optical transceiver configured to be connected to the optical communication line together with the optical transceiver.

According to the above, redundancy switch among a plurality of optical transceivers can be realized. Therefore, the optical network unit can continuously operate.

(7) Preferably, the optical network unit is configured to monitor collision of the transmission permission instructions.

According to the above, whether or not a plurality of upstream signals collide against one another in the integration unit can be monitored.

(8) Preferably, the plurality of MAC processing units include a stand-by MAC processing unit. The optical network unit further includes a communication path selection unit arranged between the optical transceiver and the integration unit, the communication path selection unit being configured to connect one of the integration unit and the stand-by MAC processing unit to the optical transceiver.

According to the above, the communication path selection unit can set a communication path between the optical transceiver and the stand-by MAC processing unit. For example, when an abnormal condition occurs in the optical network unit, an operation of the integration unit may become unstable. Even in such a case, the optical network unit can be managed without being affected by the operation of the integration unit. Therefore, maintenability of the optical network unit can be improved.

(9) Preferably, the optical network unit further includes an instruction unit. The instruction unit is configured to output a logical disjunction of the transmission permission instructions to the optical transceiver and to send to the communication path selection unit, an instruction for the communication path selection unit to connect the one of the integration unit and the stand-by MAC processing unit to the optical transceiver.

According to the above, management of transmission of signals can be facilitated.

(10) Preferably, the optical network unit further includes a first power supply supplying electric power to the plurality of MAC processing units other than the stand-by MAC processing unit and a second power supply supplying electric power to the optical transceiver, the stand-by MAC processing unit, the communication path selection unit, and the instruction unit. The second power supply is lower in speed of falling than the first power supply.

According to the above, even when the first power supply fails, the optical transceiver and the stand-by MAC processing unit can continuously be operated for some time by the second power supply. Thus, a message indicating an emergency (Dying Gasp by way of example) can be output from the stand-by MAC processing unit.

(11) Preferably, the plurality of MAC processing units include a stand-by MAC processing unit. The optical network unit further includes a communication path selection unit connected to the optical transceiver and the spare optical transceiver. The communication path selection unit is configured to select one of a first communication path through which the optical transceiver and the spare optical transceiver are connected to the integration unit and a second communication path through which the optical transceiver and the spare optical transceiver are connected to the stand-by MAC processing unit.

According to the above, the communication path selection unit can set a communication path between the optical transceiver and the stand-by MAC processing unit. Therefore, maintenability of the optical network unit can be improved. Furthermore, maintenability of the optical network unit can be enhanced by the spare optical transceiver.

(12) Preferably, the optical network unit further includes an instruction unit. The instruction unit is configured to output any one of a logical disjunction of the transmission permission instructions and the transmission permission instruction from the stand-by MAC processing unit to the optical transceiver and the spare optical transceiver and to send to the communication path selection unit, an instruction for the communication path selection unit to select the one of the first communication path and the second communication path.

According to the above, management of transmission of signals can be facilitated.

(13) Preferably, the optical network unit further includes a first power supply supplying electric power to the plurality of MAC processing units other than the stand-by MAC processing unit and a second power supply supplying electric power to the optical transceiver, the spare optical transceiver, the stand-by MAC processing unit, the communication path selection unit, and the instruction unit. The second power supply is lower in speed of falling than the first power supply.

According to the above, even when the first power supply fails, the optical transceiver and the stand-by MAC processing unit can continuously be operated for some time by the second power supply. Thus, a message indicating an emergency (Dying Gasp by way of example) can be output from the stand-by MAC processing unit.

(14) Preferably, when a first transmission permission instruction and a second transmission permission instruction which is generated subsequent to the first transmission permission instruction collide against each other, the optical network unit gives a transmission permission for transmission of the upstream signal to a MAC processing unit which has issued the first transmission permission instruction.

According to the above, the MAC processing unit which has issued a transmission permission instruction earlier can appropriately perform processing for transmission. Thus, collision of the transmission permission instructions can substantially be avoided.

(15) Preferably, when a first transmission permission instruction issued from a MAC processing unit other than the stand-by MAC processing unit and a third transmission permission instruction issued from the stand-by MAC processing unit collide against each other, the optical network unit gives a transmission permission for transmission of the upstream signal to the stand-by MAC processing unit.

According to the above, for example, in notification of an abnormal condition of a power supply (transmission of a Dying Gasp message) or in an emergency of an optical network unit, a notification can be transmitted from the stand-by MAC processing unit.

(16) Preferably, when a transmission permission instruction issued from a MAC processing unit other than the stand-by MAC processing unit and a transmission permission instruction issued from the stand-by MAC processing unit collide against each other, the optical network unit selects one of the first transmission permission instruction and the third transmission permission instruction in accordance with priority set in advance.

According to the above, an operation of the optical network unit can be flexible.

(17) A passive optical network (PON) system according to one manner of the present invention includes an optical communication line, an optical line terminal connected to the optical communication line, and an optical network unit connected to the optical communication line. The optical network unit includes an optical transceiver configured to be connected to the optical communication line, a plurality of media access control (MAC) processing units, a plurality of user network interface (UNI) ports each connected to one MAC processing unit of the plurality of MAC processing units, and an integration unit integrating a plurality of communication paths connected to the plurality of MAC processing units, respectively, and connected to the optical transceiver.

According to the above, a PON system which can efficiently make use of optical communication line resources while it realizes management of a plurality of UNI ports is realized.

(18) A control method according to one manner of the present invention is a method of controlling an optical network unit. The optical network unit includes an optical transceiver configured to be connected to an optical communication line, a plurality of media access control (MAC) processing units, a plurality of user network interface (UNI) ports each connected to one MAC processing unit of the plurality of MAC processing units, and an integration unit integrating a plurality of communication paths connected to the plurality of MAC processing units, respectively, and connected to the optical transceiver. The control method includes generating a transmission permission instruction by one MAC processing unit of the plurality of MAC processing units and setting a communication path for transmitting an upstream signal from among the plurality of communication paths in response to the transmission permission instruction.

According to the above, an optical network unit can be controlled so as to efficiently make use of optical communication line resources while management of a plurality of UNI ports is realized.

[DETALS OF EMBODMENTS OF THE PRESENT NVENTON]

Embodiments of the present invention will be described hereinafter in detail with reference to the drawings. The same or corresponding elements in the drawings have the same reference characters allotted and description thereof will not be repeated.

(Embodiment 1)

FIG. 1 is a block diagram showing a schematic configuration of a PON system according to one embodiment of the present invention. As shown in FIG. 1, a PON system 100 includes an optical line terminal (OLT) 101, a plurality of optical network units (ONU) 102, a PON line 103, and an optical splitter 104.

A user terminal (not shown) is connected to each ONU 102. The number of user terminals connected to each ONU 102 is not particularly limited. A type of the user terminal is not particularly limited either. Connection of the user terminal is not limited to direct connection to ONU 102. A user network may be connected to ONU 102. The user terminal may be connected to ONU 102 through the user network.

PON line 103 is an optical communication line implemented by an optical fiber. PON line 103 includes a trunk optical fiber 105 and a plurality of branch optical fibers 106. Optical splitter 104 is connected to trunk optical fiber 105 and a plurality of branch optical fibers 106.

An optical signal transmitted from OLT 101 passes through PON line 103 and is branched by optical splitter 104 to the plurality of ONUs 102. Optical signals transmitted from ONUs 102 are converged by optical splitter 104 and sent to OLT 101 through PON line 103. Optical splitter 104 passively branches an input signal or multiplexes input signals without particularly requiring external power supply.

Optical signals transmitted from the ONUs are merged in optical splitter 104. Control for avoiding collision after merge of signals from the ONUs in optical splitter 104 is required. OLT 101 calculates time to start transmission and an allowable amount of transmission of data accumulated in ONU 102 based on a control frame (report) transmitted from each ONU 102. Then, OLT 101 transmits a control frame (grant) in which an instruction signal has been inserted to ONUs 102 through PON line 103 and optical splitter 104.

Each ONU 102 notifies OLT 101 of a length of data in a buffer of that ONU itself in a form of a report at the time designated by the grant. Each ONU 102 receives the grant in which an instruction signal has been inserted from OLT 101. Each ONU 102 transmits data in the buffer of that ONU itself to OLT 101 together with the report, based on the instruction signal.

OLT 101 detects an ONU on PON line 103 by performing discovery processing. Furthermore, OLT 101 performs registration processing for registering the detected ONU therein.

A configuration of the PON system is the same as the configuration shown in FIG. 1 in embodiments described below. Therefore, description of the configuration of the PON system will not be repeated hereafter.

Figure 2:
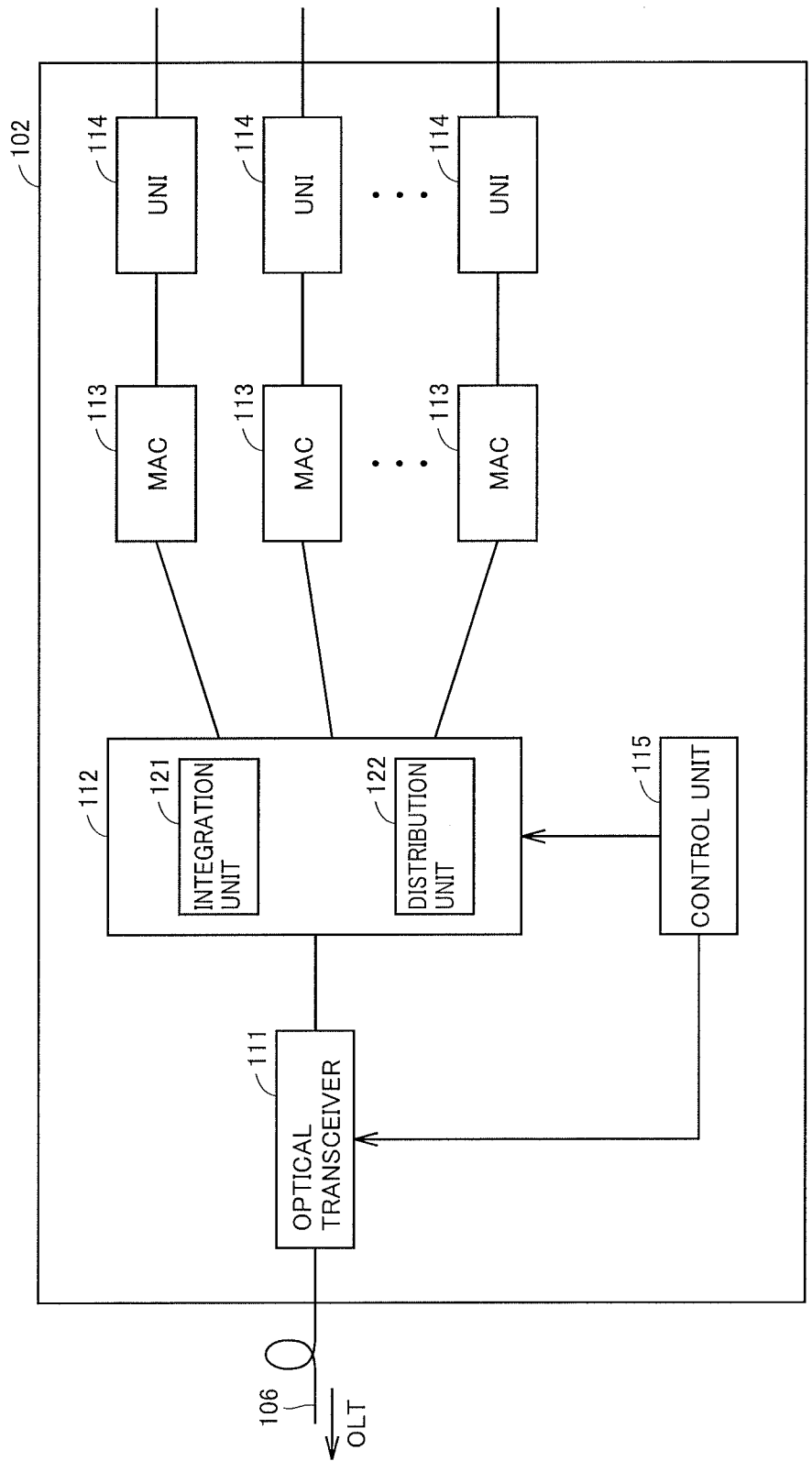
FIG. 2 is a block diagram schematically showing a configuration of an ONU according to Embodiment 1 of the present invention.

FIG. 2 is a block diagram schematically showing a configuration of the ONU according to Embodiment 1 of the present invention. As shown in FIG. 2, ONU 102 includes an optical transceiver 111, a communication path setting unit 112, a plurality of MAC processing units 113, a plurality of UNI ports 114, and a control unit 115.

Optical transceiver 111 is optically connected to branch optical fiber 106. Optical transceiver 111 is a circuit for transmitting and receiving an optical signal. Optical transceiver 111 is configured to be able to convert an optical signal into an electric signal and vice versa. Optical transceiver 111 converts a downstream signal sent in a form of an optical signal from OLT 101 into an electric signal. Optical transceiver 111 converts an upstream signal sent in a form of an electric signal from any of the plurality of MAC processing units 113 into an optical signal.

Communication path setting unit 112 sets a communication path between optical transceiver 111 and the plurality of MAC processing units 113. Communication path setting unit 112 includes an integration unit 121 and a distribution unit 122. ntegration unit 121 integrates a plurality of communication paths connected to the plurality of MAC processing units 113. Distribution unit 122 distributes a downstream signal transmitted from OLT 101 to the plurality of MAC processing units 113.

The configuration of integration unit 121 and distribution unit 122 for achieving the functions described above is not limited. ntegration unit 121 may be implemented by an electric switch or a logical circuit. Distribution unit 122 may be implemented by a line or a logical circuit.

MAC processing unit 113 performs various types of processing on a downstream signal and an upstream signal. The downstream signal includes a MAC address indicating a destination thereof. When the MAC address of the downstream signal matches with a MAC address of MAC processing unit 113 itself, the MAC processing unit performs processing in accordance with a control frame included in the downstream signal. For example, MAC processing unit 113 transmits a data frame included in the downstream signal to corresponding UNI port 114. MAC processing unit 113 may perform various types of processing such as decoding processing and error correction processing in addition to the processing above.

MAC processing unit 113 receives a frame from UNI port 114 and analyzes a header of the frame. MAC processing unit 113 once accumulates the frame. n response to an instruction from OLT 101, one MAC processing unit of the plurality of MAC processing units 113 transmits the frame together with a transmission permission instruction (a burst enable signal).

UNI port 114 is connected to a user terminal device 131 or a user network. UNI port 114 outputs a data frame sent from MAC processing unit 113. UNI port 114 receives a data frame from user terminal device 131 or the user network. UNI port 114 transfers the data frame to MAC processing unit 113.

Control unit 115 controls optical transceiver 111 and communication path setting unit 112. Control unit 115 may further control the plurality of MAC processing units 113.

An internal configuration of ONU 102 is not limited as shown in FIG. 2. By way of example, control unit 115, the plurality of MAC processing units 113, and communication path setting unit 112 may be integrated.

Figure 3:
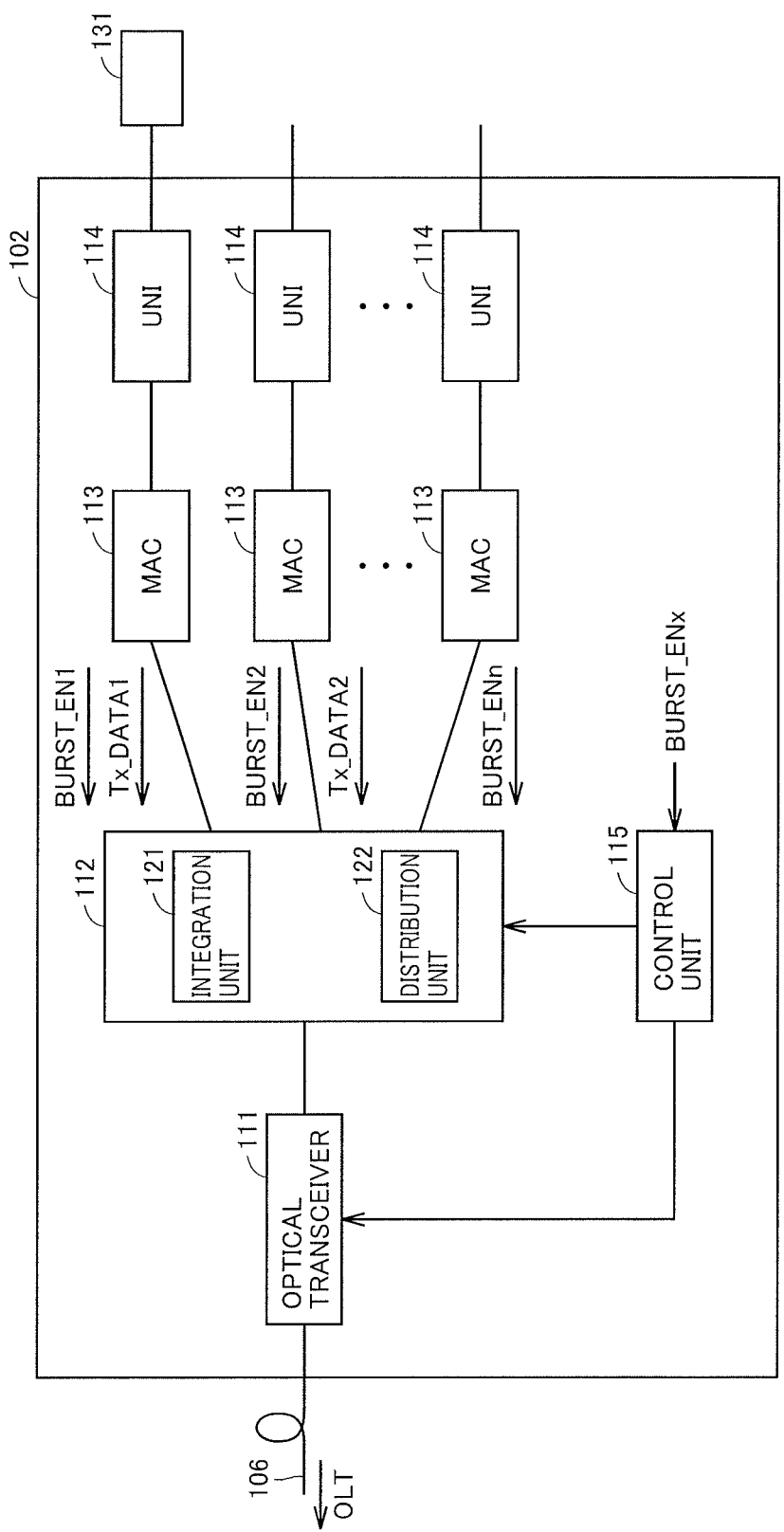
FIG. 3 is a diagram for illustrating transmission of an upstream signal by the ONU according to Embodiment 1 of the present invention.

FIG. 3 is a diagram for illustrating transmission of an upstream signal by the ONU according to Embodiment 1 of the present invention. As shown in FIG. 3, n (n being an integer not smaller than 2) MAC processing units 113 are configured to transmit burst enable signals BURST_EN1, BURST_EN2, . . . BURST_ENn, respectively. These burst enable signals are transmission permission instructions for permitting burst transmission. Data signals Tx_DATA1 to Tx_DATAn are data to be transmitted in burst from n (n being an integer not smaller than 2) MAC processing units 113.

Burst enable signals BURST_EN1, BURST_EN2, . . . BURST_ENn are sent to control unit 115. "BURST_ENx" represents a burst enable signal which has reached control unit 115. Control unit 115 sets a communication path between MAC processing unit 113 corresponding to the burst enable signal and integration unit 121. ntegration unit 121 sets a communication path for transmitting an upstream signal from among a plurality of communication paths. As the communication path is set, one of data signals Tx_DATA1 to Tx_DATAn is sent to optical transceiver 111.

Control unit 115 controls optical transceiver 111 in response to burst enable signal BURST_ENx. Optical transceiver 111 turns on or off an optical output in response to burst enable signal BURST_ENx.

Figure 4:
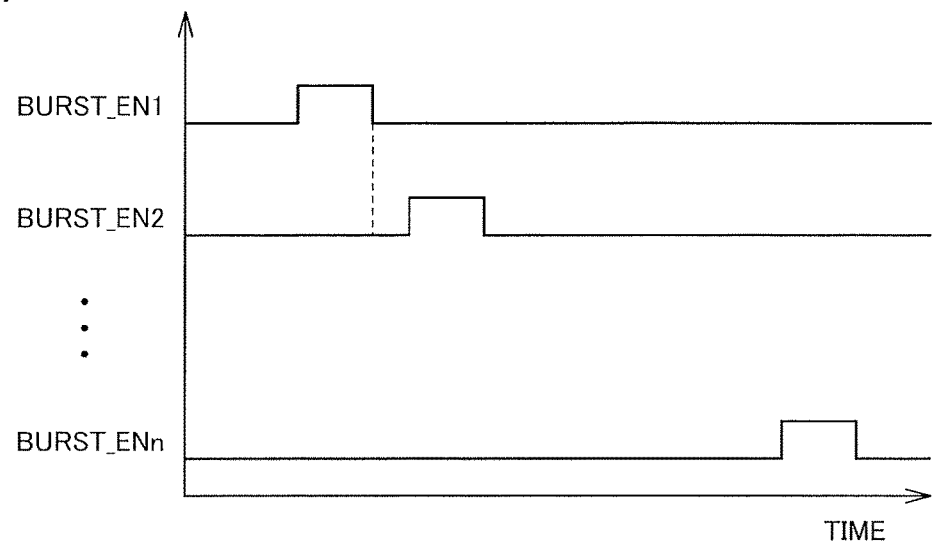
FIG. 4 is a signal waveform diagram schematically showing timing of transmission of a plurality of burst enable signals.

FIG. 4 is a signal waveform diagram schematically showing timing of transmission of a plurality of burst enable signals. As shown in FIG. 4, burst enable signals BURST_EN1, BURST_EN2, . . . BURST_ENn are transmitted from the plurality of MAC processing units 113 so as not to temporally overlap (collide). Timing of transmission of burst enable signals is controlled by OLT 101.

Figure 5:
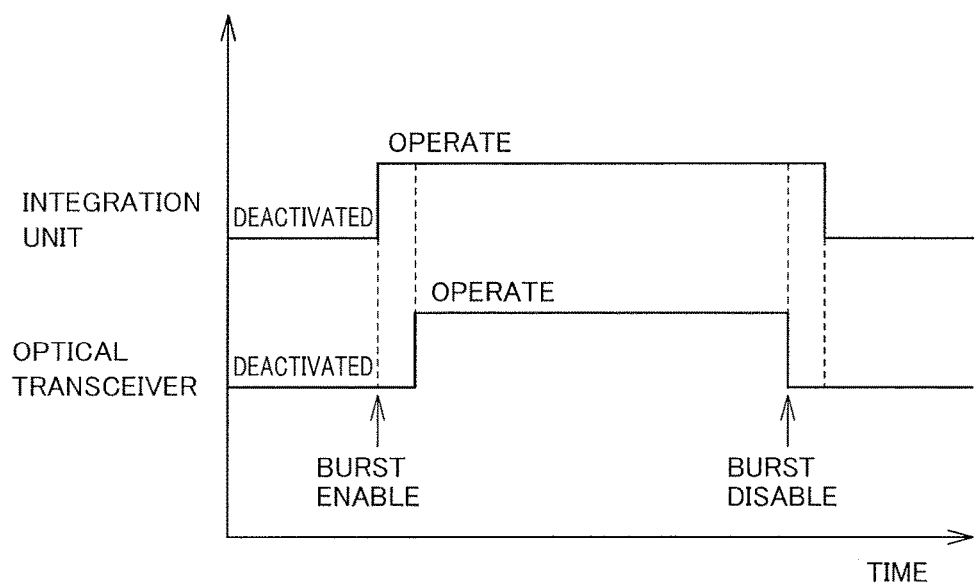
FIG. 5 is a timing chart for illustrating timing of operations of an optical transceiver and an integration unit in burst transmission.

FIG. 5 is a timing chart for illustrating timing of operations of optical transceiver 111 and integration unit 121 in burst transmission. As shown in FIG. 5, in burst enable (burst transmission allowed), integration unit 121 operates first and then optical transceiver 111 operates. The operation of integration unit 121 is to set a communication path between any one of the plurality of MAC processing units 113 and integration unit 121. The operation of optical transceiver 111 is to output an optical signal. n burst disable (stop of burst transmission), optical transceiver 111 is deactivated first and then integration unit 121 is deactivated. When optical transceiver 111 operates, a communication path is established between any one of the plurality of MAC processing units 113 and integration unit 121. Therefore, transmission of an unstable optical signal from optical transceiver 111 can be avoided. n this embodiment, timing of operations shown in FIG. 5 is controlled by control unit 115.

Figure 6:
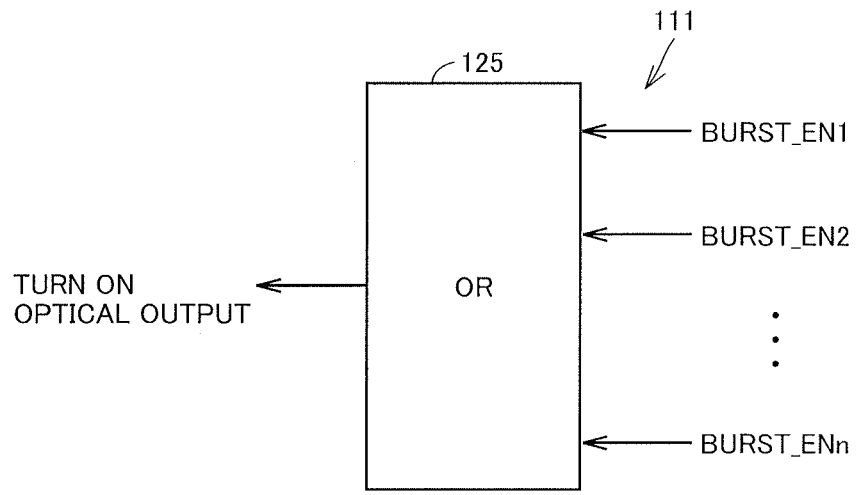
FIG. 6 is a diagram schematically showing one example of a configuration included in the optical transceiver shown in FIG. 2, for outputting an optical signal.

FIG. 6 is a diagram schematically showing one example of a configuration included in optical transceiver 111 shown in FIG. 2, for outputting an optical signal. Referring to FIG. 6, optical transceiver 111 includes an OR circuit 125. Any one of burst enable signals BURST_EN1, BURST_EN2, . . . BURST_ENn is input to OR circuit 125. n this case, OR circuit 125 outputs a signal for turning on an optical output. Thus, optical transceiver 111 outputs an optical signal.

Figure 7:
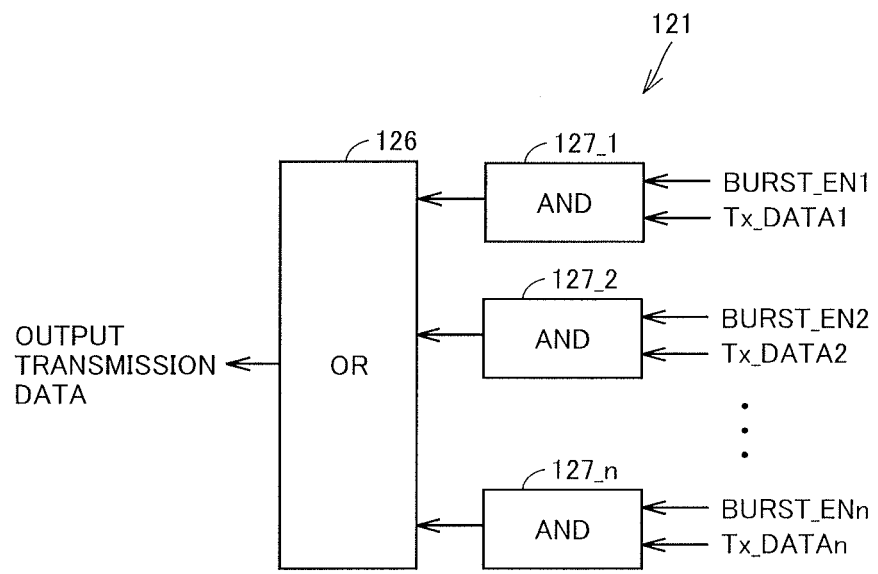
FIG. 7 is a diagram schematically showing one example of a configuration included in the integration unit shown in FIG. 2, for outputting transmission data.

FIG. 7 is a diagram schematically showing one example of a configuration included in integration unit 121 shown in FIG. 2, for outputting transmission data.

Referring to FIG. 7, integration unit 121 includes one OR circuit 126 and n AND circuits 127_1 to 127_n. Each AND circuit receives a burst enable signal and a data signal from corresponding MAC processing unit 113. Specifically, AND circuit 127_1 receives burst enable signal BURST_EN1 and data signal Tx_DATA1. AND circuit 127_2 receives burst enable signal BURST_EN2 and data signal Tx_DATA2. AND circuit 127_n receives burst enable signal BURST_ENn and data signal Tx_DATAn. Each AND circuit outputs a signal in response to the burst enable signal and the data signal. OR circuit 126 outputs transmission data in response to a signal output from any of AND circuits 127_1 to 127_n.

Figure 8:
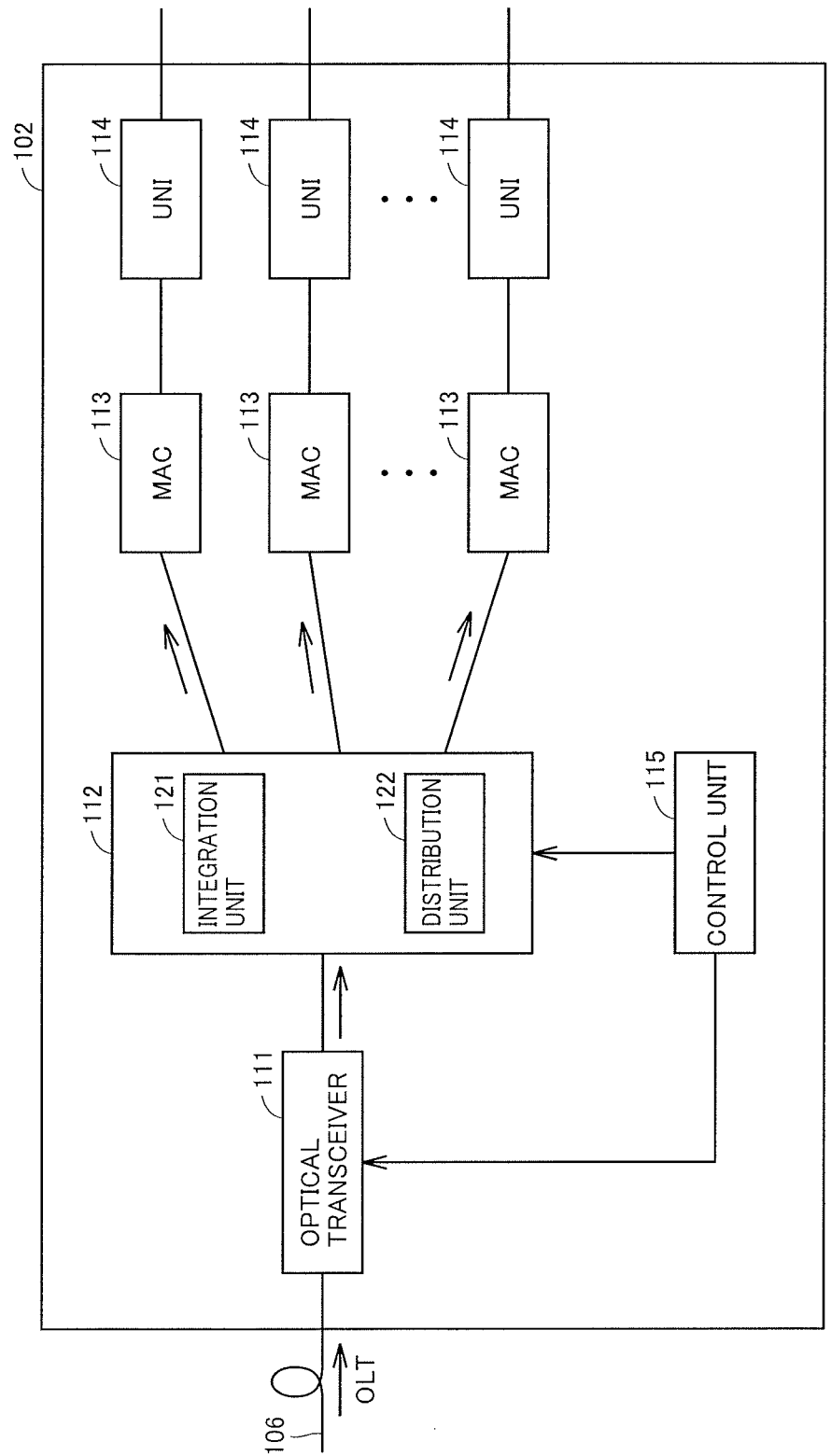
FIG. 8 is a diagram for illustrating reception of a downstream signal by the ONU according to Embodiment 1 of the present invention.

FIG. 8 is a diagram for illustrating reception of a downstream signal by the ONU according to Embodiment 1 of the present invention. As shown in FIG. 8, optical transceiver 111 receives an optical signal (a downstream signal) from OLT 101. Optical transceiver 111 converts the optical signal into an electric signal. Optical transceiver 111 transmits the downstream signal to distribution unit 122. Distribution unit 122 distributes the downstream signal to the plurality of MAC processing units 113. A method of distribution is not particularly limited.

Each MAC processing unit 113 receives the downstream signal. Based on a destination of the downstream signal, each MAC processing unit 113 performs prescribed processing on the signal or discards the signal.

Figure 9:
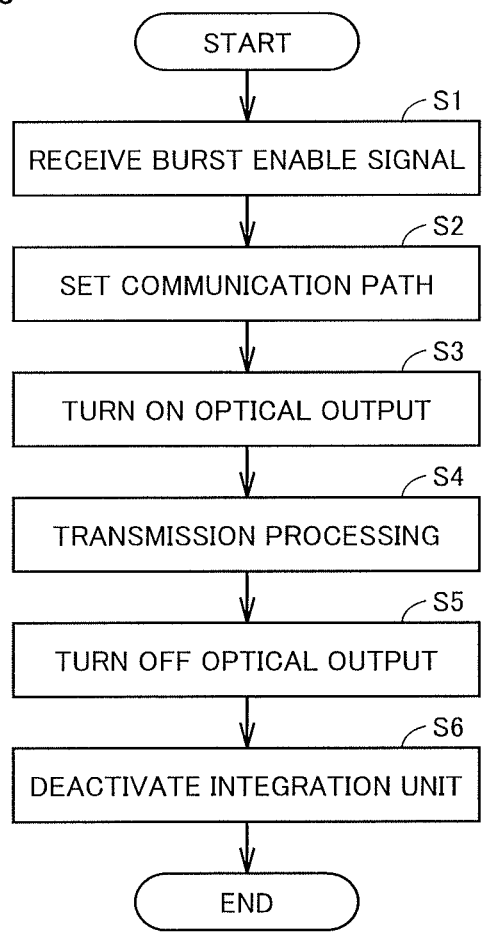
FIG. 9 is a flowchart schematically illustrating a flow of burst transmission by the ONU according to Embodiment 1 of the present invention.

FIG. 9 is a flowchart schematically illustrating a flow of burst transmission by the ONU according to Embodiment 1 of the present invention. As shown in FIG. 9, a burst enable signal is generated in any of the plurality of MAC processing units 113. Control unit 115 (see FIG. 3) receives the burst enable signal (step S1). ntegration unit 121 switches a path for communication with the plurality of MAC processing units 113 in response to the transmission permission instruction. The communication path is thus set (step S2).

After an operation of integration unit 121 is started, optical transceiver 11*l* turns on an optical output (step S3). Processing for transmitting an upstream signal is performed (step S4).

After transmission processing ends, optical transceiver 11*l* turns off the optical output (step S5). n succession, integration unit 121 is deactivated (step S6).

According to Embodiment 1 of the present invention, each MAC processing unit can manage a UNI port connected thereto. Since the optical network unit accommodates a plurality of MAC processing units, the number of optical network units connected to an optical communication line is smaller than the number of UN ports. Therefore, optical communication line (optical fiber line) resources can efficiently be made use of.

(Embodiment 2)

n Embodiment 2 of the present invention, an ONU has a redundant configuration. According to Embodiment 2, an outage due to failure in the ONU can be shortened. Therefore, the optical network unit can continuously be operated. Quality of service provided to users can thus be enhanced.

Figure 10:
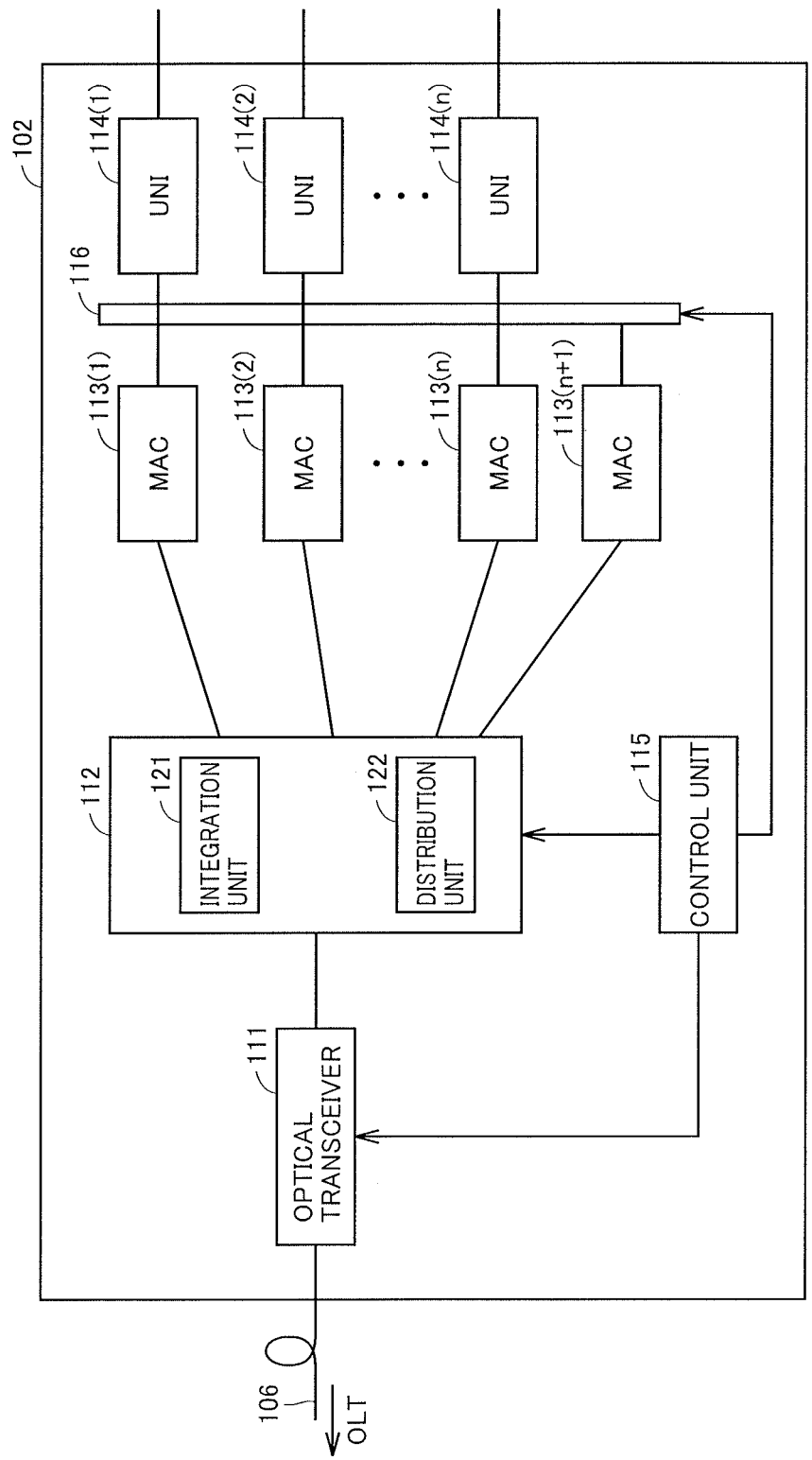
FIG. 10 is a block diagram showing one configuration example of the ONU according to Embodiment 2 of the present invention.

FIG. 10 is a block diagram showing one configuration example of the ONU according to Embodiment 2 of the present invention. As is understood from comparison between FIGS. 2 and 10, ONU 102 includes a path switching unit 116 in addition to the elements shown in FIG. 2.

ONU 102 includes MAC processing units 113 more than UNI ports 114. A difference in number between MAC processing units 113 and UNI ports 114 is at least one. n the configuration shown in FIG. 10, the number of MAC processing units 113 is (n+1) and the number of UNI ports 114 is n (n being an integer not smaller than 2). n order to describe communication paths between (n+1) MAC processing units 113 and n UNI ports 114, references ((1) to (n+1)) in parentheses are suffixed to references 113 and 114 in FIG. 10.

Path switching unit 116 switches a path for communication between the plurality of UNI ports 114 and the plurality of MAC processing units 113. For example, path switching unit 116 is controlled by control unit 115.

Since the number of MAC processing units 113 is greater than the number of UNI ports 114, ONU 102 can have a spare MAC processing unit 113. The spare MAC processing unit is used for redundancy switch. n the example shown in FIG. 10, MAC processing unit 113 (n+1) corresponds to the spare MAC processing unit. MAC processing unit 113 (1), MAC processing unit 113 (2), . . . , MAC processing unit 113 (n) form paths for communication with UNI port 114 (1), UNI port 114 (2), . . . , UNI port 114 (n), respectively.

Figure 11:
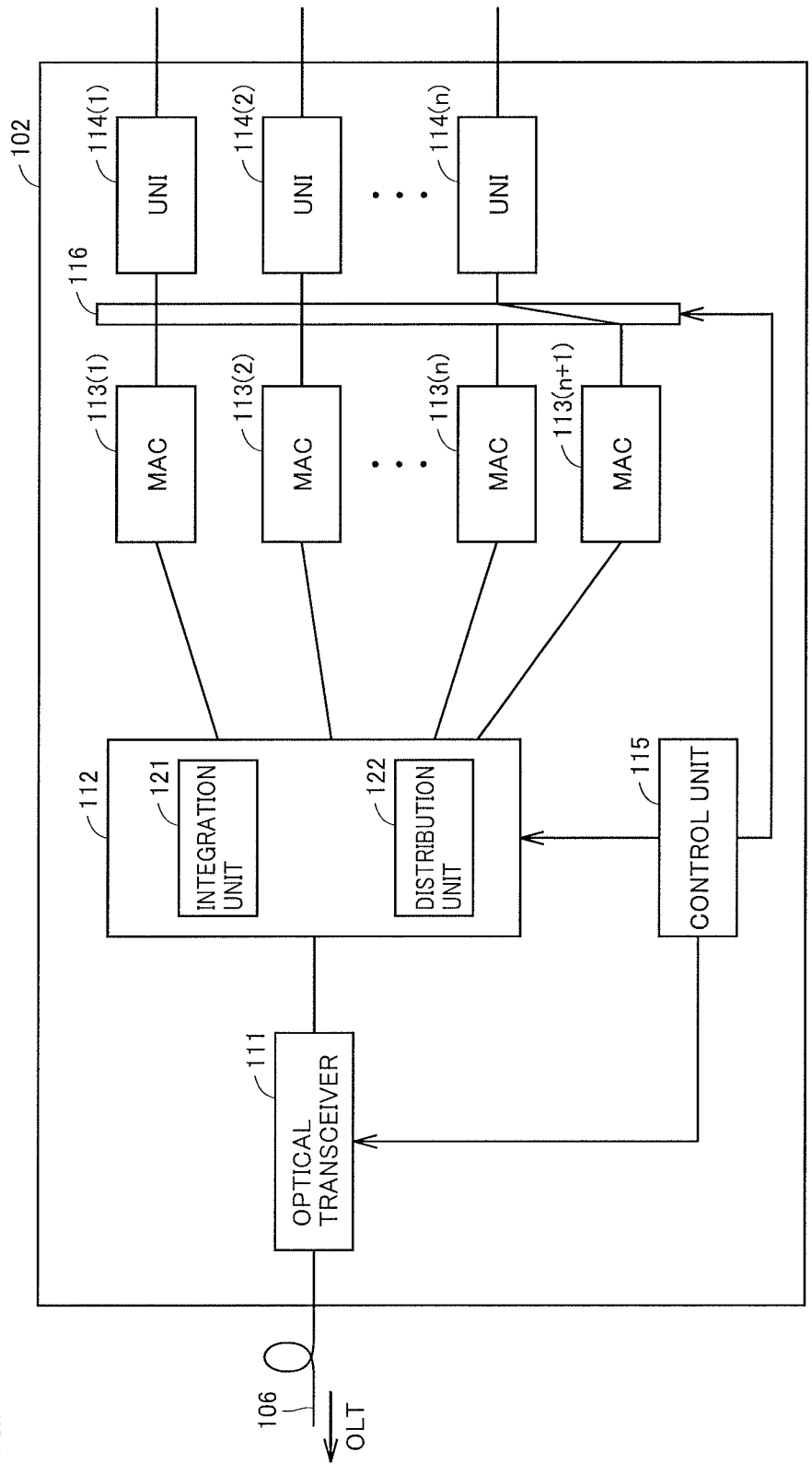
FIG. 11 is a diagram for illustrating switching of a communication path in the ONU shown in FIG. 10.

FIG. 11 is a diagram for illustrating switching of a communication path in the ONU shown in FIG. 10. n the example shown in FIG. 11, MAC processing unit 113 (n) is a failed MAC processing unit. Path switching unit 116 switches a communication path of UNI port 114 (n) from a path to MAC processing unit 113 (n) to a path to MAC processing unit 113 (n+1).

Whichever of MAC processing units 113 (1) to 113 (n+1) may fail, path switching unit 116 can replace failed MAC processing unit 113 with the spare MAC processing unit (MAC processing unit 113 (n+1)). UNI port 114 is connected to MAC processing unit 113 (n+1) instead of failed MAC processing unit 113.

Figure 12:
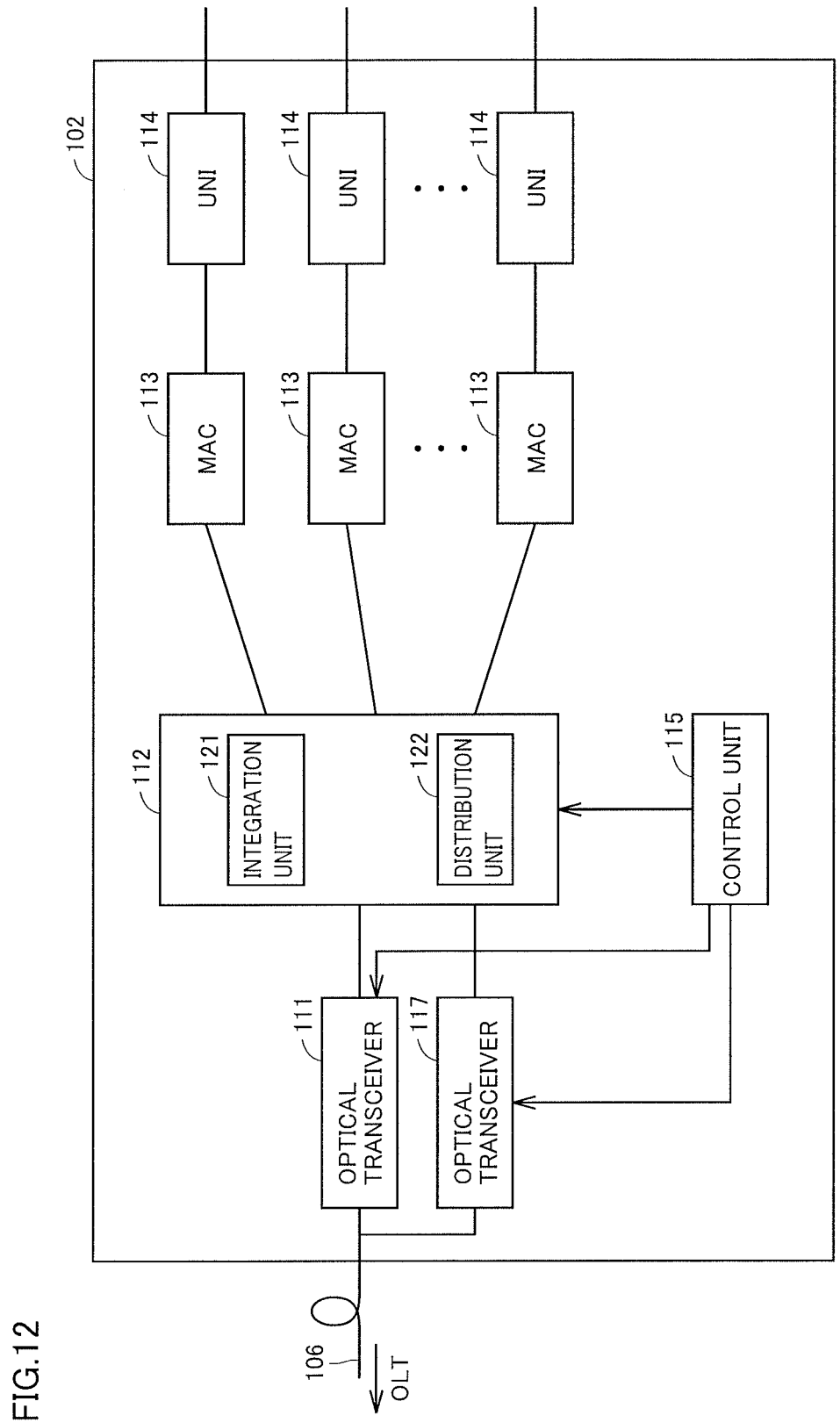
FIG. 12 is a block diagram showing another configuration example of the ONU according to Embodiment 2 of the present invention.

FIG. 12 is a block diagram showing another configuration example of the ONU according to Embodiment 2 of the present invention. As is understood from comparison between FIGS. 2 and 12, ONU 102 includes an optical transceiver 117 connected to the optical communication line (branch optical fiber 106) in addition to the elements shown in FIG. 2. Optical transceiver 117 is a spare optical transceiver. When optical transceiver 111 fails, optical transceiver 117 operates owing to redundancy switch.

Figure 13:
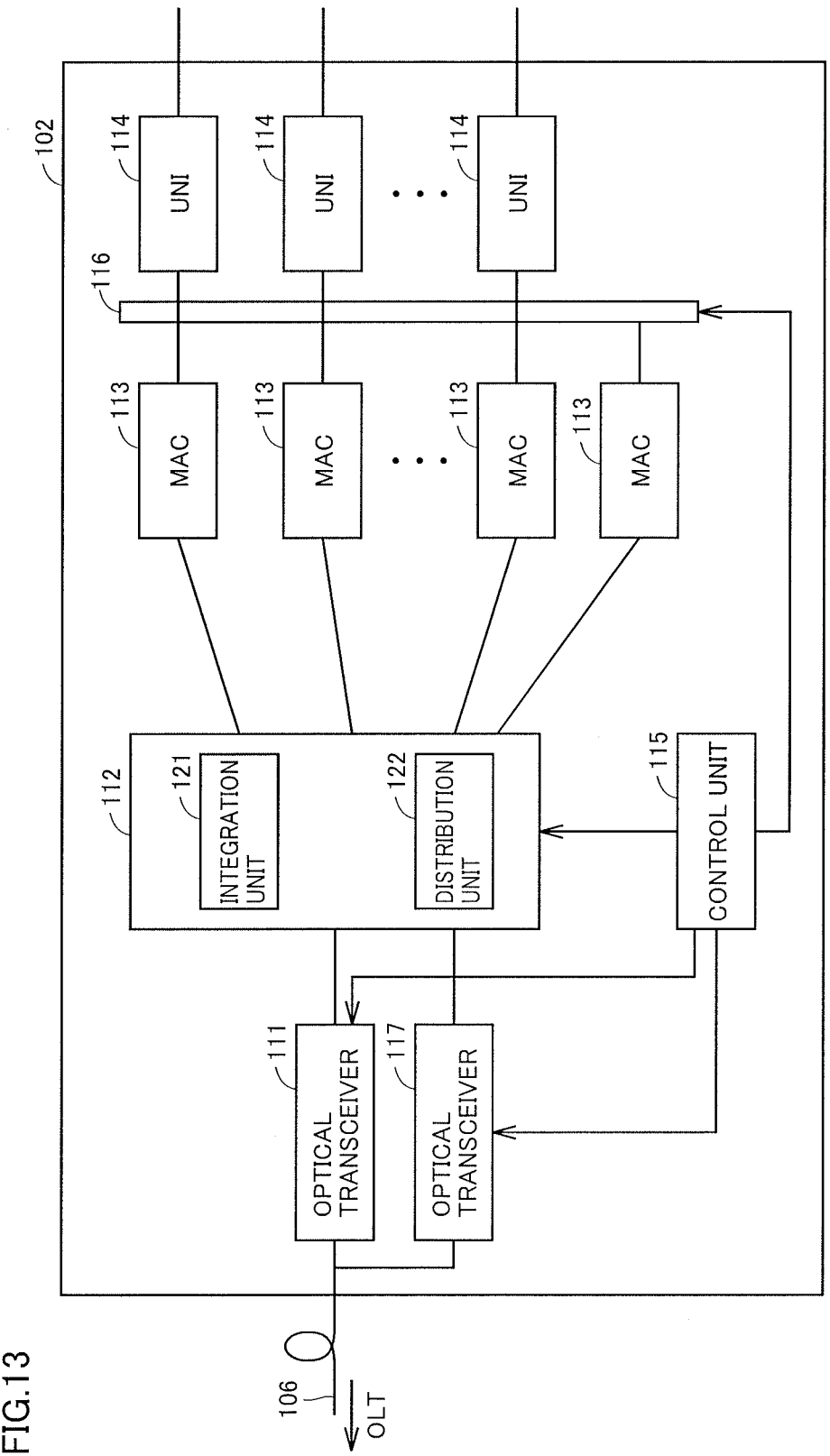
FIG. 13 is a block diagram showing yet another configuration example of the ONU according to Embodiment 2 of the present invention.

FIG. 13 is a block diagram showing yet another configuration example of the ONU according to Embodiment 2 of the present invention. The configuration shown in FIG. 13 is the same as the configuration shown in FIG. 10 and the configuration shown in FIG. 12 as being combined. ONU 102 includes path switching unit 116, MAC processing unit 113 (n+1), and optical transceiver 117 in addition to the elements shown in FIG. 2.

n the configuration shown in FIGS. 10 to 13, control unit 115 monitors the optical transceiver(s) and the MAC processing units. Control unit 115 detects failure of an optical transceiver or failure of a MAC processing unit. Alternatively, the MAC processing unit for redundancy switch may detect failure of an optical transceiver or a MAC processing unit by monitoring the optical transceiver(s) and the MAC processing units.

(Embodiment 3)

n Embodiment 3 of the present invention, the ONU monitors whether or not two or more transmission permission instructions collide.

Figure 14:
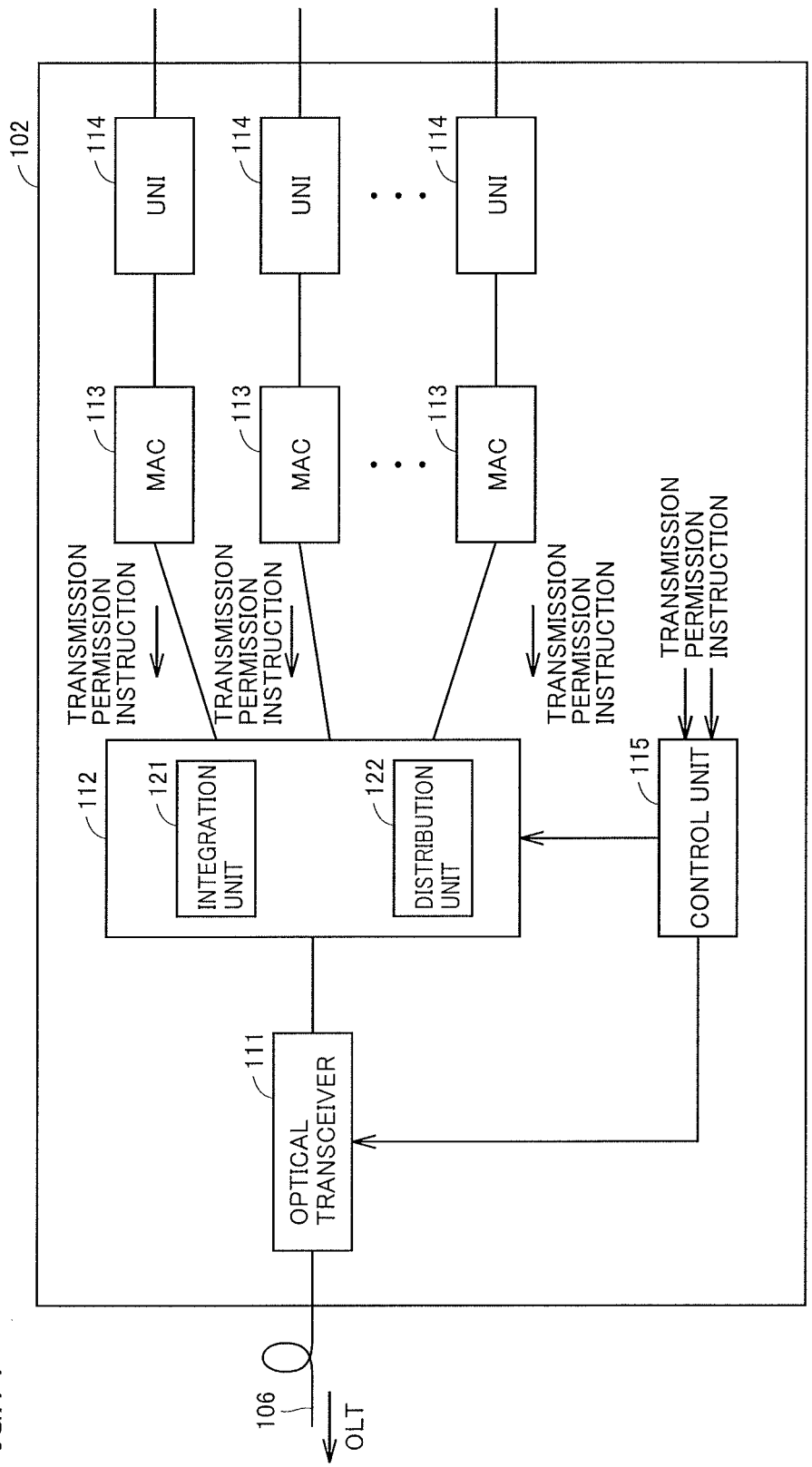
FIG. 14 is a block diagram schematically showing a configuration of the ONU according to Embodiment 3 of the present invention.

FIG. 14 is a block diagram schematically showing a configuration of the ONU according to Embodiment 3 of the present invention. As shown in FIG. 14, control unit 115 receives a transmission permission instruction. Control unit 115 monitors whether or not two or more transmission permission instructions temporally overlap (that is, collide). When two or more transmission permission instructions temporally overlap, control unit 115 controls subsequent transmission processing based on a type of the transmission permission instruction.

There are a plurality of types of transmission permission instructions. One type is a response from OLT 101 to discovery (a register request frame). n this case, integration unit 121 selects any one of a plurality of temporally overlapping register request frames.

Criteria for selecting one transmission permission instruction from among a plurality of transmission permission instructions are predetermined. For example, priority is set in advance among the plurality of MAC processing units 113. A transmission permission instruction sent from MAC processing unit 113 highest in priority is selected.

Figure 15:
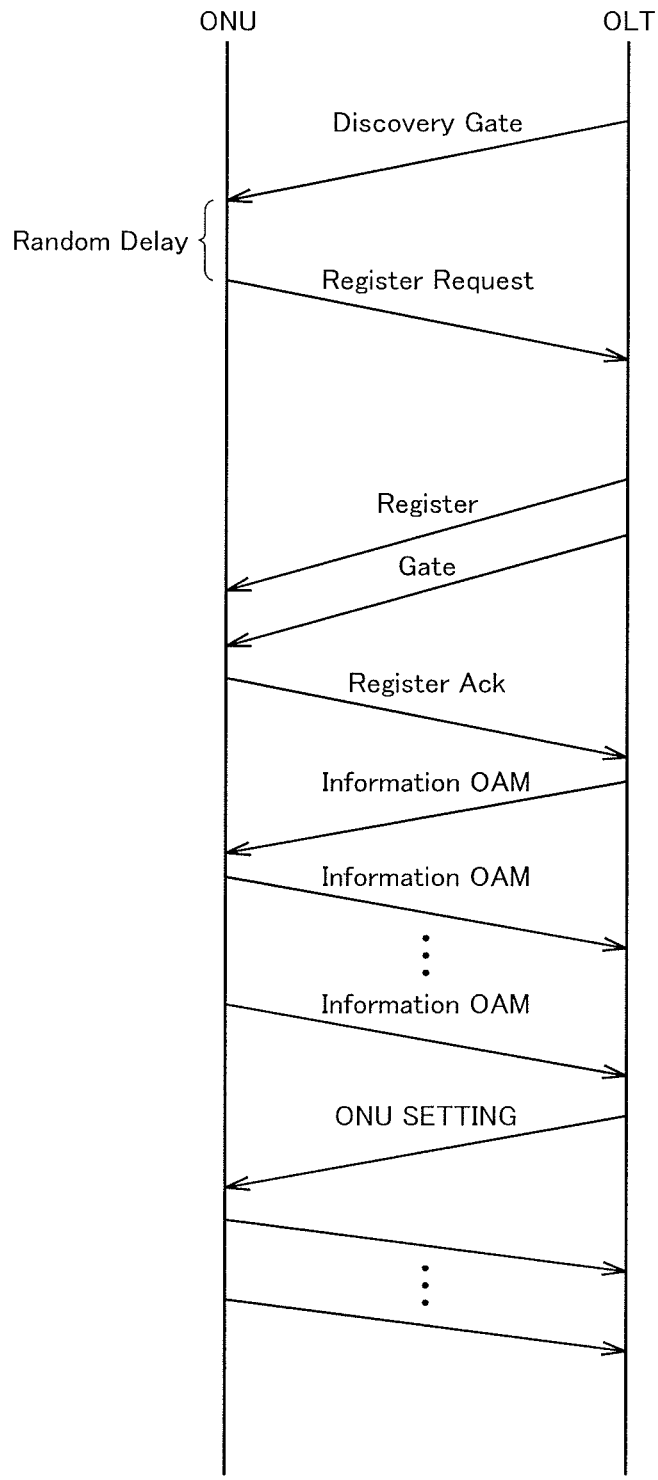
FIG. 15 is a sequence diagram for schematically illustrating processing performed by an OLT in association with registration of an ONU.

FIG. 15 is a sequence diagram for schematically illustrating processing performed by the OLT in association with registration of an ONU. Referring to FG. 15, the OLT performs discovery processing (MPCP discovery processing). Discovery processing refers to processing for detecting an ONU connected to a PON interface and connecting the ONU to the OLT.

nitially, OLT 101 broadcasts a discovery gate frame. ONU 102 receives the discovery gate frame. When there is a transmission request for responding to the discovery gate frame, ONU 102 transmits a register request frame after a random delay has elapsed. The register request frame includes a media access control (MAC) address of ONU 102 as a sender address.

OLT 101 accepts the register request frame from ONU 102. OLT 101 transmits a register frame in response to the register request frame. The register frame includes a MAC address of a destination (ONU 102), a MAC address of a sender (OLT 101), and a logical link D (LLID) allocated to ONU 102. OLT 101 stores the MAC address of ONU 102 in association with the LLID. ONU 102 stores the LLID given from OLT 101 in the register frame.

OLT 101 transmits a gate frame including information on the time of transmission or a time period of transmission to the ONU. n response to the gate, ONU 102 transmits a register acknowledgement (Register ACK) frame to OLT 101.

Then, OLT 101 performs operations, administration and maintenance (OAM) discovery processing. OLT 101 transmits an nformation OAM frame to linked-up ONU 102. n response, the ONU transmits an nformation OAM frame to OLT 101.

After OAM discovery processing, OLT 101 performs processing for setting ONU 102. OLT 101 transmits a control frame including information on various types of setting of ONU 102 to ONU 102. ONU 102 sets functions thereof upon receiving the control frame. Furthermore, ONU 102 transmits a control frame indicating completion of setting to OLT 101.

As shown in FIG. 14, ONU 102 accommodates a plurality of MAC processing units 113. The plurality of MAC processing units 113 may simultaneously return register requests to the discovery gate from OLT 101. When a plurality of register request frames temporally overlap, control unit 115 controls integration unit 121 such that any one of the plurality of register request frames passes through integration unit 121. The discovery gate from OLT 101 is repeatedly transmitted. Each MAC processing unit 113 can return the register request at any timing.

After ONU 102 is linked up, transmission permission instructions sent from MAC processing units 113 are controlled by OLT 101 so as not to collide. Collision of two or more transmission permission instructions may be caused by a failure in ONU 102. When two or more transmission permission instructions collide in a normal communication state (a linked-up ONU), control unit 115 determines that ONU 102 has failed.

Figure 16:
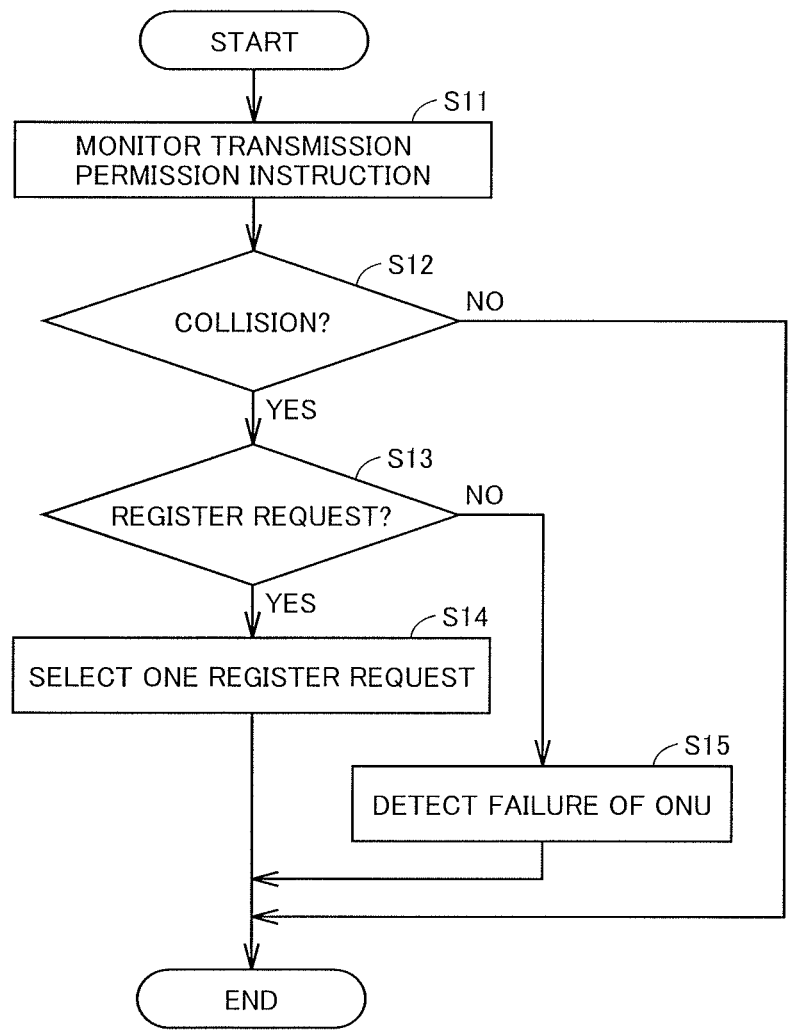
FIG. 16 is a flowchart schematically illustrating processing for detecting collision of transmission permission instructions by the ONU according to Embodiment 3 of the present invention.

FIG. 16 is a flowchart schematically illustrating processing for detecting collision of transmission permission instructions by the ONU according to Embodiment 3 of the present invention. This processing is mainly performed by control unit 115. As shown in FIG. 16, control unit 115 monitors a transmission permission instruction (step S1). Control unit 115 determines whether or not a plurality of transmission permission instructions collide (step S12).

When there is no collision of a plurality of transmission permission instructions (NO in step S12), the flow ends. When it is determined that a plurality of transmission permission instructions collide (YES in step S12), the process proceeds to step S13.

Control unit 115 determines in step S13 whether or not each of the plurality of transmission permission instructions is a register request. When each of the plurality of transmission permission instructions is a register request (YES in step S13), control unit 115 selects one of the plurality of register requests (step S14). When each of the plurality of transmission permission instructions is different from the register request (NO in step S13), control unit 115 detects failure of ONU 102 (step S15).

According to Embodiment 3 of the present invention, in addition to the effect in Embodiment 1, an effect of ability to monitor whether or not a state of an ONU is normal can be obtained.

(Embodiment 4)

n Embodiment 4 of the present invention, the ONU can continue management thereof even in an emergency.

Figure 17:
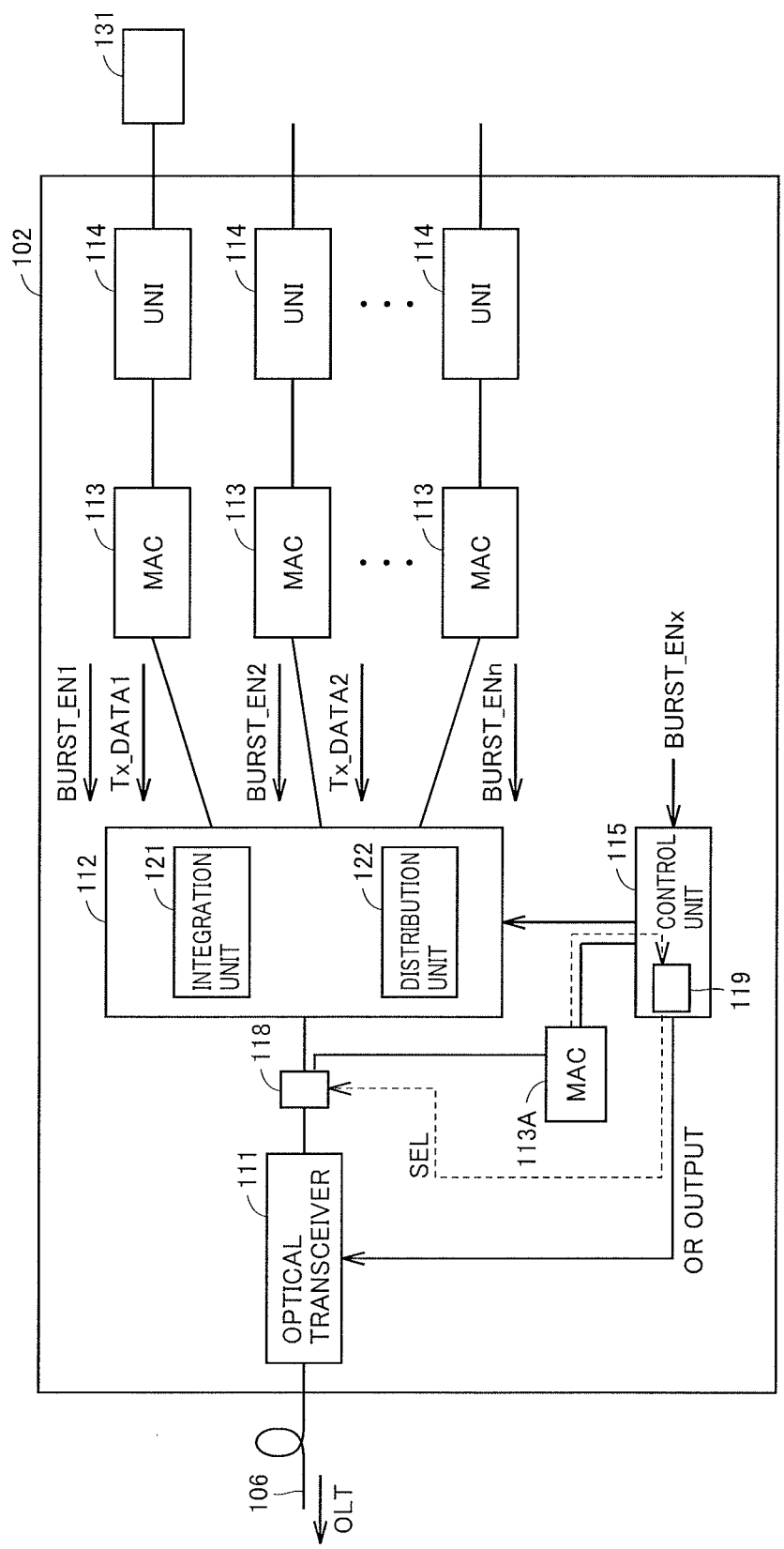
FIG. 17 is a block diagram schematically showing a configuration of the ONU according to Embodiment 4 of the present invention.

FIG. 17 is a block diagram schematically showing a configuration of the ONU according to Embodiment 4 of the present invention. n Embodiment 4, ONU 102 includes a MAC processing unit 113A (a stand-by MAC processing unit), a communication path selection unit 118, and an instruction unit 119 in addition to the configuration shown in FIG. 3.

Communication path selection unit 118 is arranged between optical transceiver 111 and integration unit 121. Specifically, communication path selection unit 118 is connected to optical transceiver 111 and connected to one of communication path setting unit 112 and MAC processing unit 113A. Communication path selection unit 118 selects a target of connection to optical transceiver 111 from communication path setting unit 112 and MAC processing unit 113A in response to a signal SEL from instruction unit 119.

MAC processing unit 113A (stand-by MAC processing unit) is connected to control unit 115. Control unit 115 includes instruction unit 119. MAC processing unit 113A outputs a burst enable signal BURST_EN (transmission permission instruction) to control unit 115.

nstruction unit 119 generates a logical disjunction (an OR output) of burst enable signals BURST_EN from the plurality of MAC processing units including MAC processing units 113 and 113A. nstruction unit 119 outputs the OR output of burst enable signals BURST_EN to optical transceiver 111. Furthermore, instruction unit 119 transmits signal SEL for selecting a communication path to communication path selection unit 118. When a circuit is configured with a positive logic, an operation of a logical disjunction can be realized by an OR circuit, however, without being limited as such. When a circuit is configured with a negative logic, an operation of a logical disjunction can be realized by an AND circuit.

n an emergency such as off of power supply, an operation of communication path setting unit 112 tends to be unstable. When an operation of communication path setting unit 112 is unstable, communication by each of the plurality of MAC processing units 113 may be cut off. n such a case, some of the plurality of MAC processing units 113 may not be able to transmit a message indicating an emergency (Dying Gasp by way of example) to OLT 101.

n order to avoid such a problem, an emergency power supply (for example, a capacitor) may be provided in ONU 102. Power consumption, however, may be different for each component in ONU 102. Depending on an amount of power consumption by the plurality of MAC processing units 113, a capacitor of a large capacity or a large number of capacitors may be required as the emergency power supply. From a point of view of cost or a size, it is not realistic to mount a capacitor of a large capacity or a large number of capacitors on ONU 102.

According to Embodiment 4, in an emergency, instruction unit 119 detects an abnormal condition based on an output from MAC processing unit 113A. nstruction unit 119 outputs signal SEL for connecting communication path selection unit 118 to MAC processing unit 113A. A communication path is thus set between optical transceiver 111 and MAC processing unit 113A. nformation (for example, a notification about an abnormal condition) from MAC processing unit 113A is transmitted to OLT 101 through communication path selection unit 118, optical transceiver 111, and PON line 103.

According to Embodiment 4, even though an operation of communication path setting unit 112 is unstable in an emergency, ONU 102 can be managed without being affected by communication path setting unit 112. Therefore, maintenability of ONU 102 can be enhanced.

According to Embodiment 4, instruction unit 119 manages burst enable signals from the plurality of MAC processing units including the stand-by MAC processing unit in a unified manner and outputs a logical disjunction of the burst enable signals. Therefore, management of transmission of signals can be facilitated.

According to the configuration shown in FIG. 17, instruction unit 119 is included in control unit 115. nstruction unit 119, however, may be provided separately from control unit 115. This is also applicable to embodiments described hereafter.

(Embodiment 5

As in Embodiment 4, in Embodiment 5 of the present invention, an ONU can continue management thereof even in an emergency.

Figure 18:
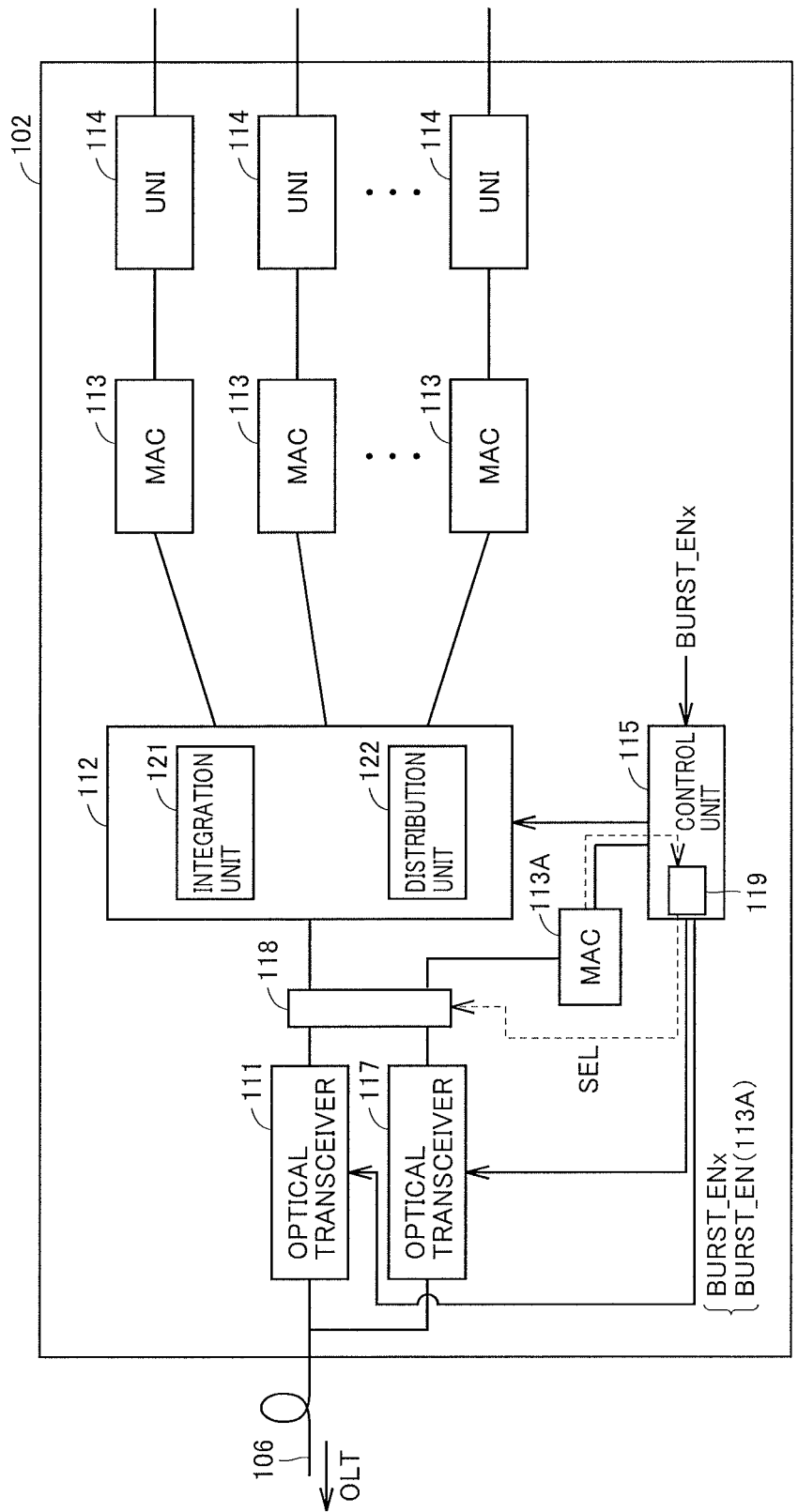
FIG. 18 is a block diagram schematically showing a configuration of the ONU according to Embodiment 5 of the present invention.

FIG. 18 is a block diagram schematically showing a configuration of the ONU according to Embodiment 5 of the present invention. n Embodiment 5, ONU 102 includes optical transceiver 117 in addition to the configuration shown in FIG. 17. As in the configuration shown in FIG. 12, when optical transceiver 111 fails, optical transceiver 117 operates owing to redundancy switch.

n Embodiment 5, communication path selection unit 118 can be implemented by a cross switch. Communication path selection unit 118 is arranged between optical transceivers 111 and 117 and integration unit 121. Communication path selection unit 118 is connected to optical transceivers 111 and 117 and connected to one of communication path setting unit 112 and MAC processing unit 113A. Communication path selection unit 118 selects a target of connection to optical transceiver 111 from communication path setting unit 112 and MAC processing unit 113A in response to signal SEL from instruction unit 119. Communication path selection unit 118 selects a target of connection to optical transceiver 117 from communication path setting unit 112 and MAC processing unit 113A in response to signal SEL from instruction unit 119. For example, optical transceiver 111 is connected to integration unit 121, whereas optical transceiver 117 is connected to MAC processing unit 113A.

nstruction unit 119 generates a logical disjunction (an OR output) of burst enable signals BURST_EN from the plurality of MAC processing units 113. nstruction unit 119 outputs one or both of an OR output of burst enable signals BURST_EN and burst enable signal BURST_EN from MAC processing unit 113A. Optical transceiver 111 and optical transceiver 117 receive outputs from instruction unit 119. Furthermore, instruction unit 119 transmits signal SEL for selecting a communication path to communication path selection unit 118.

Description of a portion in the configuration of ONU 102 according to Embodiment 5 common to that in the configuration of the ONU according to other embodiments will not be repeated. As in Embodiment 4, according to Embodiment 5, even when an operation of communication path setting unit 112 is unstable in an emergency, ONU 102 can be managed without being affected by communication path setting unit 112. Therefore, maintenability of ONU 102 can be enhanced.

Furthermore, according to Embodiment 5, instruction unit 119 generates a logical disjunction (an OR output) of burst enable signals BURST_EN from the plurality of MAC processing units 113. Management of transmission of signals can thus be facilitated.

Furthermore, according to Embodiment 5, communication path selection unit 118 can allocate optical transceivers 111 and 117 to integration unit 121 and MAC processing unit 113A, respectively. ONU 102 has a spare optical transceiver and a stand-by MAC processing unit. Maintenability of ONU 102 can thus further be enhanced.

Figure 19:
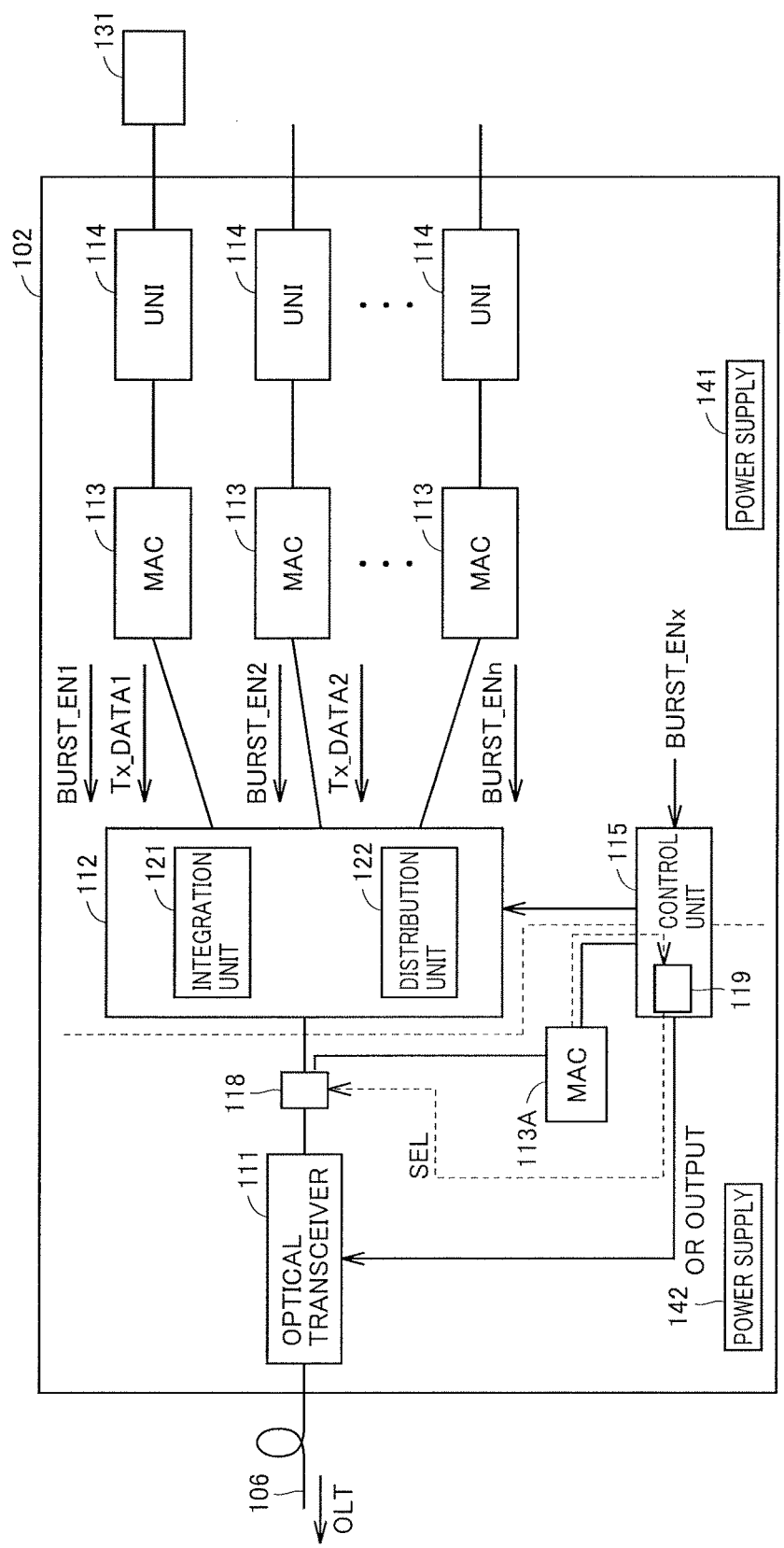
FIG. 19 is a block diagram schematically showing a configuration of the ONU according to Embodiment 6 of the present invention.

(Embodiment 6)

n Embodiment 6, ONU 102 has a stand-by power supply. FIG. 19 is a block diagram schematically showing a configuration of the ONU according to Embodiment 6 of the present invention.

Referring to FIG. 19, in Embodiment 6, ONU 102 includes power supplies 141 and 142. Power supply 142 is a power supply in a different system from power supply 141. Therefore, simultaneous failure of power supply 141 and power supply 142 can be prevented.

n the configuration shown in FIG. 19, power supply 141 supplies electric power to communication path setting unit 112, the plurality of MAC processing units 113, UNI port 114, and control unit 115 (a portion except for instruction unit 119). Power supply 142 supplies electric power to optical transceiver 111, communication path selection unit 118, MAC processing unit 113A, and instruction unit 119. A dashed line in ONU 102 shows a boundary between ranges in which power supplies 141 and 142 supply electric power.

Description of a portion in the configuration of ONU 102 according to Embodiment 6 common to that in the configuration of the ONU according to other embodiments will not be repeated.

Power supply 142 is independent of power supply 141. A time constant of falling of power supply 142 can thus be set independently of a time constant of falling of power supply 141. Power supply 142 is lower in speed of falling than power supply 141. n other words, power supply 142 falls slower than power supply 141.

A period during which electric power is supplied by power supply 142 is longer than a time period during which electric power is supplied by power supply 141. Therefore, according to Embodiment 6, when power supply 141 fails, power supply 142 can continue to operate optical transceiver 111, MAC processing unit 113A, communication path selection unit 118, and instruction unit 119 for some time. Thus, a message (Dying Gasp by way of example) indicating an emergency can be transmitted from MAC processing unit 113A to OLT 101.

Figure 20:
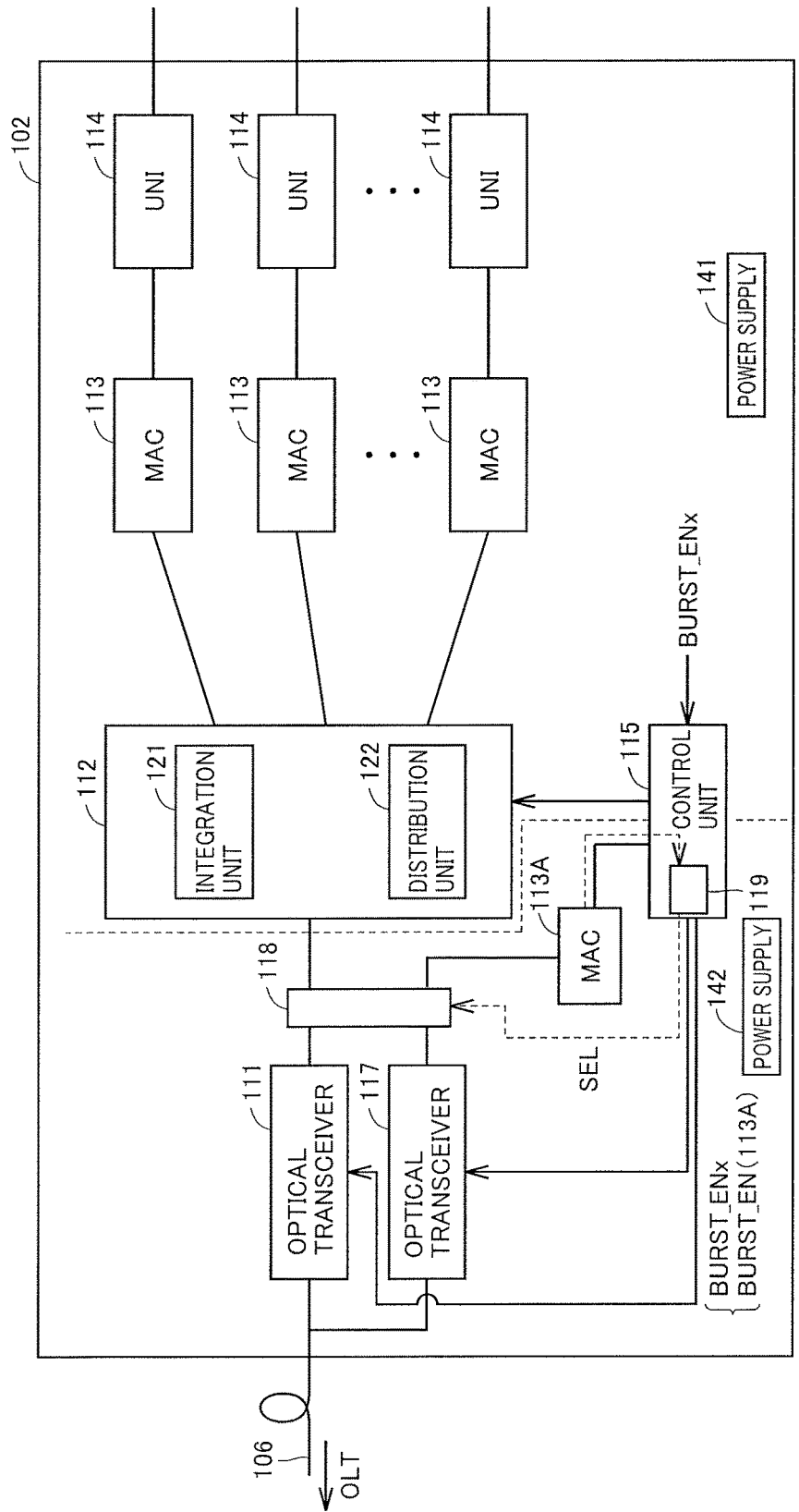
FIG. 20 is a block diagram schematically showing another configuration of the ONU according to Embodiment 6 of the present invention.

FIG. 20 is a block diagram schematically showing another configuration of the ONU according to Embodiment 6 of the present invention. As shown in FIG. 20, optical network unit 102 may include optical transceiver 117 in addition to optical transceiver 111. The configuration shown in FIG. 20 is different from the configuration shown in FIG. 18 in further including power supplies 141 and 142. Power supply 142 supplies electric power to optical transceiver 117 in addition to optical transceiver 111.

(Embodiment 7)

ONU 102 according to Embodiment 7 is the same in configuration as ONU 102 (see FIG. 14) according to Embodiment 3. n Embodiment 7, when two or more transmission permission instructions (burst enable signals) collide, an earliest transmission permission instruction is selected.

Figure 21:
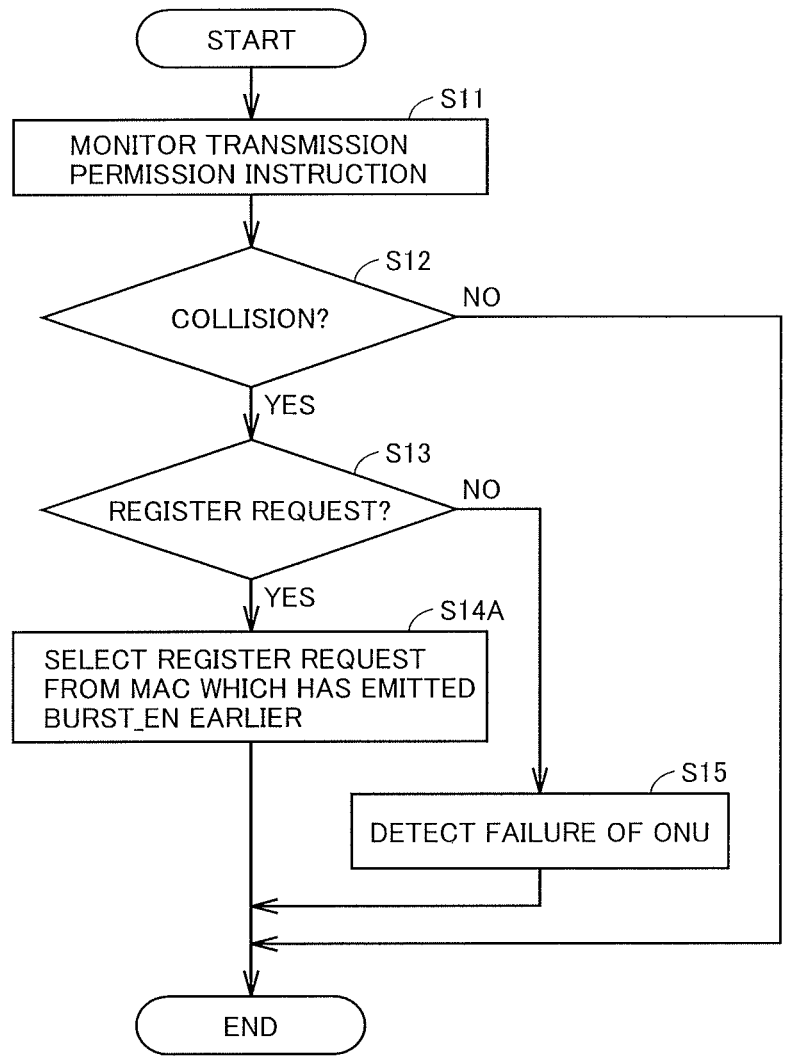
FIG. 21 is a flowchart schematically illustrating processing for selecting a transmission permission instruction according to Embodiment 7 of the present invention.

FIG. 21 is a flowchart schematically illustrating processing for selecting a transmission permission instruction according to Embodiment 7 of the present invention. The processing is mainly performed by control unit 115.

Referring to FIGS. 16 and 21, in Embodiment 7, processing in a step S14A is performed instead of the processing in step S14. Since processing in other steps is the same as the processing in corresponding steps shown in FIG. 16, description will not be repeated.

n step S14A, control unit 115 selects a register request from MAC processing unit 113 which has issued burst enable signal BURST_EN earlier. Specifically, a first burst enable signal and a second burst enable signal generated subsequently to the first burst enable signal collide against each other in integration unit 121.

Control unit 115 gives a permission to transmit data (an upstream signal) to MAC processing unit 113 which has issued the first burst enable signal. The first burst enable signal reaches control unit 115 earlier than the second burst enable signal. Thus, control unit 115 determines that the first burst enable signal was generated earlier than the second burst enable signal.

OLT 101 performs registration processing for MAC processing unit 113 which has issued the first burst enable signal based on the first burst enable signal. Registration processing for MAC processing unit 113 which has issued the second burst enable signal may subsequently be performed.

According to Embodiment 7, a MAC processing unit which has issued a transmission permission instruction earlier can appropriately perform processing for transmission. Collision of transmission permission instructions can thus substantially be avoided.

n the examples shown in FIGS. 16 and 21, the first burst enable signal and the second burst enable signal are both register requests. A type of the transmission permission instruction, however, is not limited to the register request. This is also applicable to other embodiments.

(Embodiment 8)

ONU 102 according to Embodiment 8 is the same in configuration as the ONUs, for example, according to Embodiments 4, 5, and 6. n Embodiment 8, when a transmission permission instruction from stand-by MAC processing unit 113A and a transmission permission instruction from a MAC processing unit (MAC processing unit 113) other than the stand-by MAC processing unit collide against each other, the transmission permission instruction from the stand-by MAC processing unit is selected.

Figure 22:
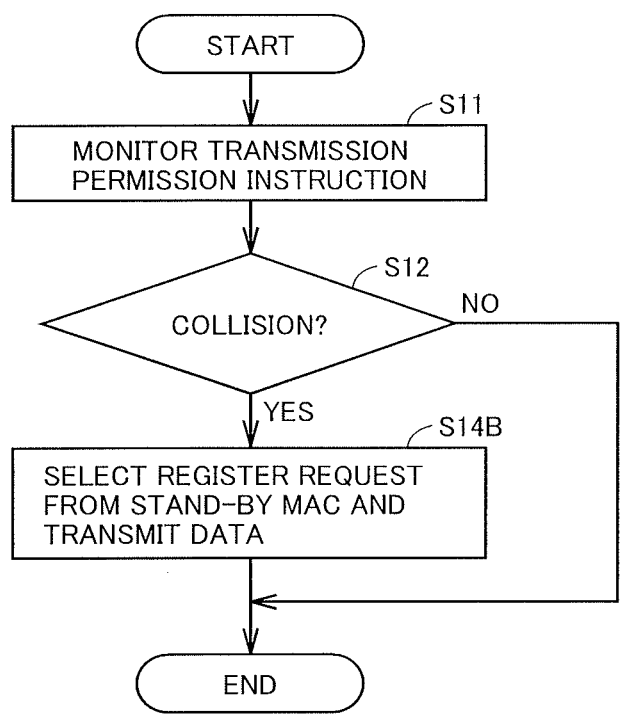
FIG. 22 is a flowchart schematically illustrating processing for selecting a transmission permission instruction according to Embodiment 8 of the present invention.

FIG. 22 is a flowchart schematically illustrating processing for selecting a transmission permission instruction according to Embodiment 8 of the present invention. The processing is mainly performed by control unit 115.

Referring to FIGS. 16 and 22, in Embodiment 8, processing in a step S14B is performed instead of the processing in step S14. Furthermore, in Embodiment 8, the processing in steps S13 and S15 does not have to be performed. Since processing in other steps is the same as the processing in corresponding steps shown in FIG. 16, description will not be repeated.

n step S12, first burst enable signal BURST_EN emitted from integration unit 121 collides against second burst enable signal BURST_EN emitted from stand-by MAC processing unit 113A. n this case (YES in step S12), control unit 115 selects in step S14B the burst enable signal from stand-by MAC processing unit 113A. Control unit 115 gives a permission to transmit data (an upstream signal) to stand-by MAC processing unit 113A. After lapse of prescribed delay since selection of the burst enable signal from stand-by MAC processing unit 113A, stand-by MAC processing unit 113A may emit data. Data at a head portion can thus be emitted from stand-by MAC processing unit 113A in a stable manner.

According to Embodiment 8, collision of burst enable signals (transmission permission instructions) can substantially be avoided. Therefore, for example, in notification of an abnormal condition of a power supply (transmission of a Dying Gasp message) or in an emergency of ONU 102, OLT 101 can be notified of a state of ONU 102 by stand-by MAC processing unit 113A.

(Embodiment 9)

ONU 102 according to Embodiment 9 is the same in configuration as ONU 102 according to Embodiment 4, 5, or 6. n Embodiment 9, priority is set in advance among the plurality of MAC processing units 113. A burst enable signal sent from MAC processing unit 113 highest in priority is selected. When ONU 102 includes stand-by MAC processing unit 113A in addition to the plurality of MAC processing units 113, priority is set in advance among the plurality of MAC processing units 113 and stand-by MAC processing unit 113A. When a plurality of burst enable signals collide, a burst enable signal sent from a MAC processing unit highest in priority is selected. The priority can be set, for example, by instruction unit 119.

Figure 23:
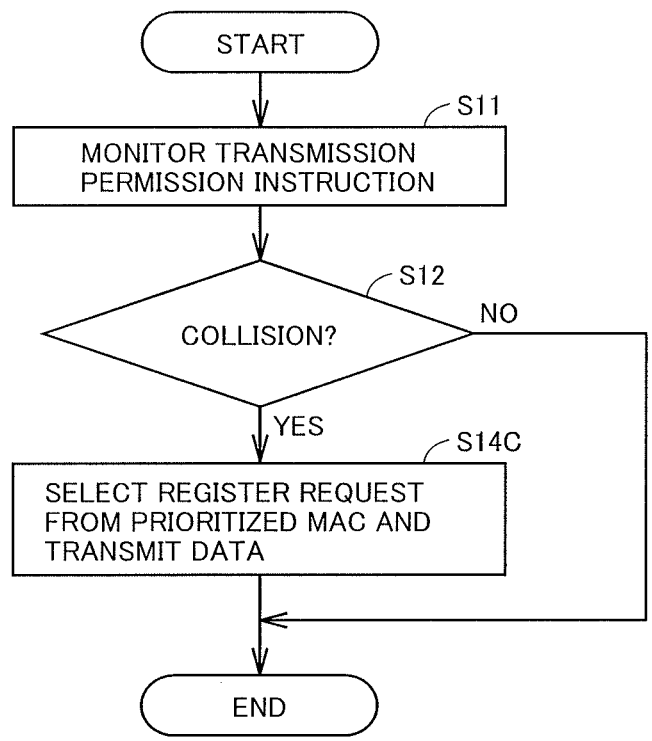
FIG. 23 is a flowchart schematically illustrating processing for selecting a transmission permission instruction according to Embodiment 9 of the present invention.

FIG. 23 is a flowchart schematically illustrating processing for selecting a transmission permission instruction according to Embodiment 9 of the present invention. The processing is mainly performed by control unit 115.

Referring to FIGS. 16 and 23, in Embodiment 9, processing in a step S14C is performed instead of the processing in step S14. Furthermore, in Embodiment 9, the processing in steps S13 and S15 does not have to be performed. Since processing in other steps is the same as the processing in corresponding steps shown in FIG. 16, description will not be repeated.

n step S12, a plurality of burst enable signals BURST_EN collide, for example, in integration unit 121. n this case (YES in step S12), control unit 115 selects in step S14C a burst enable signal from MAC processing unit 113 in accordance with the priority set in advance. MAC processing unit 113 which has issued the selected burst enable signal transmits data. After lapse of prescribed delay since selection of the burst enable signal from MAC processing unit 113, data may be emitted from that MAC processing unit 113. Data at a head portion can thus be emitted from MAC processing unit 113 in a stable manner.

According to Embodiment 9, collision of burst enable signals (transmission permission instructions) can be avoided. According to Embodiment 9, one transmission permission instruction from among a plurality of transmission permission instructions can be selected in accordance with the priority set in advance. Which of a burst enable signal emitted from integration unit 121 and a burst enable signal emitted from stand-by MAC processing unit 113A should be prioritized when they collide against each other can be set in advance. Therefore, an operation of ONU 102 can be flexible.

<Additional Aspects>

(1) According to the embodiments disclosed herein, an optical network unit includes an optical transceiver configured to be connected to an optical communication line, a plurality of MAC processing units, a plurality of UNI ports each connected to one MAC processing unit of the plurality of MAC processing units, and an integration unit integrating a plurality of communication paths connected to the plurality of MAC processing units, respectively, and connected to the optical transceiver. Any of the plurality of MAC processing units monitors a state of the optical network unit.

(2) According to the embodiments disclosed herein, an optical network unit includes an optical transceiver configured to be connected to an optical communication line, a plurality of MAC processing units, a plurality of UNI ports each connected to one MAC processing unit of the plurality of MAC processing units, and an integration unit integrating a plurality of communication paths connected to the plurality of MAC processing units, respectively, and connected to the optical transceiver. The plurality of MAC processing units include a spare MAC processing unit. The spare MAC processing unit monitors a state of the optical network unit.

(3) According to the embodiments disclosed herein, an optical network unit includes an optical transceiver configured to be connected to an optical communication line, a plurality of MAC processing units, a plurality of UNI ports each connected to one MAC processing unit of the plurality of MAC processing units, an integration unit integrating a plurality of communication paths connected to the plurality of MAC processing units, respectively, and connected to the optical transceiver, and a control unit. The control unit monitors a state of the optical network unit.

(4) According to the embodiments disclosed herein, an optical network unit includes an optical transceiver configured to be connected to an optical communication line, a plurality of MAC processing units, a plurality of UNI ports each connected to one MAC processing unit of the plurality of MAC processing units, and an integration unit integrating a plurality of communication paths connected to the plurality of MAC processing units, respectively, and connected to the optical transceiver. The integration unit sets a communication path for transmission of an upstream signal from among a plurality of communication paths in response to a transmission permission instruction. The transmission permission instruction is a register request for registering any of the MAC processing units. When a plurality of transmission permission instructions collide, the optical network unit selects any one of the plurality of transmission permission instructions.

(5) According to the embodiments disclosed herein, an optical network unit includes an optical transceiver configured to be connected to an optical communication line, a plurality of MAC processing units, a plurality of UNI ports each connected to one MAC processing unit of the plurality of MAC processing units, and an integration unit integrating a plurality of communication paths connected to the plurality of MAC processing units, respectively, and connected to the optical transceiver. The integration unit sets a communication path for transmission of an upstream signal from among a plurality of communication paths in response to a transmission permission instruction. When a plurality of transmission permission instructions collide while the optical network unit is linked up to the optical communication line, the optical network unit detects failure of the optical network unit.

t should be understood that the embodiments disclosed herein are illustrative and non-restrictive in every respect. The scope of the present invention is defined by the terms of the claims, rather than the embodiments above, and is intended to include any modifications within the scope and meaning equivalent to the terms of the claims.

REFERENCE SGNS LST

100 PON system; 103 PON line; 104 optical splitter; 105 trunk optical fiber; 106 branch optical fiber; 111, 117 optical transceiver; 112 communication path setting unit; 113, 113A MAC processing unit; 114 UNI port; 115 control unit; 116 path switching unit; 118 communication path selection unit; 119 instruction unit; 121 integration unit; 122 distribution unit; 125, 126 OR circuit; 127_1 to 127_n AND circuit; 131 user terminal device; 141, 142 power supply; BURST_EN1 to BURST_ENn burst enable signal; S1 to S6, S11 to S15, S14A, S14B, S14C step; and Tx_DATA1 to Tx_DATAn data signal

The invention claimed is:

1. An optical network unit comprising:
an optical transceiver configured to be connected to an optical communication line on a side of an optical line terminal;
a plurality of media access control (MAC) processing units connected to a plurality of communication paths on the side of the optical line terminal, respectively;
a plurality of user network interface (UNI) ports each connected to one MAC processing unit of the plurality of MAC processing units; and
an integration circuitry integrating a plurality of communication paths connected to the plurality of MAC processing units, respectively, and connected to the optical transceiver, wherein
the integration circuitry includes
  a plurality of AND circuits corresponding to the plurality of MAC processing units, respectively, each of the plurality of AND circuits operates a logical conjunction of a transmission permission instruction and a data signal from a corresponding MAC processing unit to output a signal, and
  an OR circuit operating a logical disjunction of the signal from each of the plurality of MAC processing units to output a transmission data signal, and
the optical transceiver is configured to operate a logical disjunction of the transmission permission instruction from each of the plurality of MAC processing units to output a signal for controlling an output of an optical signal.

2. The optical network unit according to claim 1, wherein the integration circuitry sets a communication path for transmitting an upstream signal from among the plurality of communication paths in response to a transmission permission instruction.

3. The optical network unit according to claim 2, wherein the plurality of MAC processing units include a stand-by MAC processing unit, and
the optical network unit further comprises a communication path selection circuitry arranged between the optical transceiver and the integration circuitry, the communication path selection circuitry being configured to connect one of the integration circuitry and the stand-by MAC processing unit to the optical transceiver.

4. The optical network unit according to claim 3, the optical network unit further comprising an instruction circuitry, wherein
the instruction circuitry is configured to output a logical disjunction of the transmission permission instructions to the optical transceiver and to send to the communication path selection circuitry, an instruction for the communication path selection circuitry to connect the one of the integration circuitry and the stand-by MAC processing unit to the optical transceiver.

5. The optical network unit according to claim 4, the optical network unit further comprising:
a first power supply supplying electric power to the plurality of MAC processing units other than the stand-by MAC processing unit; and
a second power supply supplying electric power to the optical transceiver, the stand-by MAC processing unit, the communication path selection circuitry, and the instruction circuitry, wherein
the second power supply is lower in speed of falling than the first power supply.

6. The optical network unit according to claim 3, wherein when a first transmission permission instruction issued from a MAC processing unit other than the stand-by MAC processing unit and a third transmission permission instruction issued from the stand-by MAC processing unit collide against each other, the optical network unit gives a transmission permission for transmission of the upstream signal to the stand-by MAC processing unit.

7. The optical network unit according to claim 3, wherein when a first transmission permission instruction issued from a MAC processing unit other than the stand-by MAC processing unit and a third transmission permission instruction issued from the stand-by MAC processing unit collide against each other, the optical network unit selects one of the first transmission permission instruction and the third transmission permission instruction in accordance with priority set in advance.

8. The optical network unit according to claim 2, the optical network unit being configured to monitor collision of the transmission permission instructions.

9. The optical network unit according to claim 8, wherein when a first transmission permission instruction and a second transmission permission instruction which is generated subsequent to the first transmission permission instruction collide against each other, the optical network unit gives a transmission permission for transmission of the upstream signal to a MAC processing unit which has issued the first transmission permission instruction.

10. The optical network unit according to claim 1, the optical network unit further comprising a distribution circuitry distributing, when the optical transceiver receives a downstream signal, the downstream signal to the plurality of MAC processing units.

11. The optical network unit according to claim 1, wherein
the optical transceiver is activated after the integration circuitry is activated, and
the integration circuitry is deactivated when the optical transceiver is deactivated.

12. The optical network unit according to claim 1, wherein
the plurality of MAC processing units include a spare MAC processing unit,
the optical network unit further comprises a path switching circuitry for switching a path for communication between the plurality of UNI ports and the plurality of MAC processing units, and
when a MAC processing unit connected to any of the plurality of UNI ports fails, the path switching circuitry makes switching from the failed MAC processing unit to the spare MAC processing unit.

13. The optical network unit according to claim 1, the optical network unit further comprising a spare optical transceiver configured to be connected to the optical communication line together with the optical transceiver.

14. The optical network unit according to claim 13, wherein
the plurality of MAC processing units include a stand-by MAC processing unit,
the optical network unit further comprises a communication path selection circuitry connected to the optical transceiver and the spare optical transceiver, and
the communication path selection circuitry is configured to select one of a first communication path through which the optical transceiver and the spare optical transceiver are connected to the integration circuitry and a second communication path through which the optical transceiver and the spare optical transceiver are connected to the stand-by MAC processing unit.

15. The optical network unit according to claim 14, the optical network unit further comprising an instruction circuitry, wherein the instruction circuitry is configured to output any one of a logical disjunction of the transmission permission instructions and a transmission permission instruction from the stand-by MAC processing unit to the optical transceiver and the spare optical transceiver and to send to the communication path selection unit circuitry, an instruction for the communication path selection circuitry to select the one of the first communication path and the second communication path.

16. The optical network unit according to claim 15, the optical network unit further comprising:
a first power supply supplying electric power to the plurality of MAC processing units other than the stand-by MAC processing unit; and
a second power supply supplying electric power to the optical transceiver, the spare optical transceiver, the stand-by MAC processing unit, the communication path selection circuitry, and the instruction circuitry, wherein
the second power supply is lower in speed of falling than the first power supply.

17. A passive optical network (PON) system comprising:
an optical communication line;
an optical line terminal connected to the optical communication line; and
an optical network unit connected to the optical communication line,
the optical network unit including
an optical transceiver configured to be connected to the optical communication line on a side of the optical line terminal,
a plurality of media access control (MAC) processing units connected to a plurality of communication paths on the side of the optical line terminal, respectively,
a plurality of user network interface (UNI) ports each connected to one MAC processing unit of the plurality of MAC processing units, and
an integration circuitry integrating a plurality of communication paths connected to the plurality of MAC processing units, respectively, and connected to the optical transceiver, wherein
the integration circuitry includes
a plurality of AND circuits corresponding to the plurality of MAC processing units, respectively, each of the plurality of AND circuits operates a logical conjunction of a transmission permission instruction and a data signal from a corresponding MAC processing unit to output a signal, and
an OR circuit operating a logical disjunction of the signal from each of the plurality of MAC processing units to output a transmission data signal, and
the optical transceiver is configured to operate a logical disjunction of the transmission permission instruction from each of the plurality of MAC processing units to output a signal for controlling an output of an optical signal.

18. A method of controlling an optical network unit, the optical network unit including an optical transceiver configured to be connected to an optical communication line on a side of an optical line terminal, a plurality of media access control (MAC) processing units connected to a plurality of communication paths on the side of the optical line terminal, respectively, a plurality of user network interface (UNI) ports each connected to one MAC processing unit of the plurality of MAC processing units, and an integration circuitry integrating a plurality of communication paths connected to the plurality of MAC processing units, respectively, and connected to the optical transceiver, wherein the integration circuitry includes
a plurality of AND circuits corresponding to the plurality of MAC processing units, respectively, each of the plurality of AND circuits operates a logical conjunction of a transmission permission instruction and a data signal from a corresponding MAC processing unit to output a signal, and
an OR circuit operating a logical disjunction of the signal from each of the plurality of MAC processing units to output a transmission data signal, and
the optical transceiver is configured to operate a logical disjunction of the transmission permission instruction from each of the plurality of MAC processing units to output a signal for controlling an output of an optical signal,
the method comprising;
generating a transmission permission instruction by one MAC processing unit of the plurality of MAC processing units; and
setting a communication path for transmitting an upstream signal from among the plurality of communication paths in response to the transmission permission instruction.

* * * * *